United States Patent
Oda et al.

(10) Patent No.: US 10,511,381 B2
(45) Date of Patent: Dec. 17, 2019

(54) COMMUNICATION SYSTEM AND FAULT LOCATION SPECIFYING METHOD

(71) Applicant: NIPPON TELEGRAPH AND TELEPHONE CORPORATION, Tokyo (JP)

(72) Inventors: Takuya Oda, Yokosuka (JP); Tetsuro Inui, Yokosuka (JP); Akira Hirano, Yokosuka (JP); Wataru Imajuku, Yokosuka (JP); Shoukei Kobayashi, Yokosuka (JP); Takafumi Tanaka, Yokosuka (JP); Yutaka Miyamoto, Yokosuka (JP); Hidehiko Takara, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 15/778,011

(22) PCT Filed: Nov. 22, 2016

(86) PCT No.: PCT/JP2016/084588
§ 371 (c)(1),
(2) Date: May 22, 2018

(87) PCT Pub. No.: WO2017/090603
PCT Pub. Date: Jun. 1, 2017

(65) Prior Publication Data
US 2018/0351639 A1   Dec. 6, 2018

(30) Foreign Application Priority Data

Nov. 26, 2015  (JP) ................... 2015-230875

(51) Int. Cl.
*H04B 10/07* (2013.01)
*H04B 10/077* (2013.01)
(Continued)

(52) U.S. Cl.
CPC ..... *H04B 10/0771* (2013.01); *G02B 6/02042* (2013.01); *H04B 10/075* (2013.01);
(Continued)

(58) Field of Classification Search
CPC ............ H04B 10/0771; H04B 10/25; H04B 10/25753; H04B 10/075; H04B 10/07;
(Continued)

(56) References Cited

U.S. PATENT DOCUMENTS 5,276,440 A * 1/1994 Jolissaint ............ H04J 3/14
340/3.43
6,005,696 A * 12/1999 Joline ............... H04B 10/07
370/241

(Continued)

FOREIGN PATENT DOCUMENTS

JP  3153140 A  7/1991
JP  2011-160086 A  8/2011
(Continued)

OTHER PUBLICATIONS

International Search Report issued in PCT/JP2016/084588, dated Jan. 24, 2017; ISA/JP, Tokyo, with English translation.
(Continued)

*Primary Examiner* — Dibson J Sanchez
(74) *Attorney, Agent, or Firm* — Harness, Dickey & Pierce, P.L.C.

(57) ABSTRACT

A communication system includes three or more nodes, and a multi-core fiber having a plurality of cores, the multi-core fiber being used in at least a partial segment of a connection between the nodes, wherein each of nodes includes: a fault
(Continued)

information transmitting device configured to transmit fault information indicating that a fault has occurred in a communication path between one node and another node of the nodes when it is detected that it is not possible to perform communication between the one node and the another node; and a fault location specifying device configured to specify a section between nodes in which a fault has occurred on the basis of the fault information received from the fault information transmitting device provided in each of the nodes.

4 Claims, 15 Drawing Sheets

(51) Int. Cl.
| | | |
|---|---|---|
| *H04L 12/437* | (2006.01) | |
| *H04B 10/25* | (2013.01) | |
| *H04J 14/02* | (2006.01) | |
| *G02B 6/02* | (2006.01) | |
| *H04B 10/075* | (2013.01) | |
| *H04B 10/2575* | (2013.01) | |

(52) U.S. Cl.
CPC ....... *H04B 10/25* (2013.01); *H04B 10/25753* (2013.01); *H04J 14/0201* (2013.01); *H04L 12/437* (2013.01); *H04B 10/07* (2013.01)

(58) Field of Classification Search
CPC . H04J 14/0201; G02B 6/02042; H04L 12/437
USPC .......................................... 398/1–38, 43–103
See application file for complete search history.

(56) References Cited

U.S. PATENT DOCUMENTS

| | | | | |
|---|---|---|---|---|
| 6,317,429 | B1 | 11/2001 | Nakata et al. | |
| 6,601,185 | B1* | 7/2003 | Bass | G06F 11/0781 714/25 |
| 6,725,401 | B1* | 4/2004 | Lindhorst-Ko | H04J 14/0227 714/47.3 |
| 6,937,821 | B1* | 8/2005 | Heath | H04B 10/077 398/38 |
| 6,980,736 | B1* | 12/2005 | Fee | H04Q 11/0005 398/12 |
| 7,188,280 | B2* | 3/2007 | Shinomiya | H04L 29/06 370/225 |
| 7,424,220 | B2* | 9/2008 | Miyazaki | H04J 14/0227 398/19 |
| 7,664,397 | B2* | 2/2010 | Yuki | H04J 14/0221 398/10 |
| 9,917,672 | B2* | 3/2018 | Jensen | H04J 14/02 |
| 2002/0089712 | A1* | 7/2002 | Kang | H04B 10/032 398/1 |
| 2002/0097460 | A1* | 7/2002 | Ikoma | H04B 10/00 398/9 |
| 2002/0159113 | A1* | 10/2002 | Tokunaga | H04B 10/07 398/14 |
| 2002/0176130 | A1* | 11/2002 | Maeno | H04B 10/0791 398/20 |
| 2003/0185148 | A1* | 10/2003 | Shinomiya | H04J 14/0227 370/216 |
| 2004/0205239 | A1* | 10/2004 | Doshi | H04J 14/0227 709/241 |
| 2004/0208501 | A1* | 10/2004 | Saunders | H04B 10/0793 398/9 |
| 2005/0105905 | A1* | 5/2005 | Ovadia | H04L 45/62 398/47 |
| 2006/0256711 | A1* | 11/2006 | Kusama | H04L 43/0811 370/216 |
| 2007/0036544 | A1* | 2/2007 | Fukashiro | H04J 14/0227 398/19 |
| 2007/0182584 | A1* | 8/2007 | Ogino | H04Q 9/00 340/870.21 |
| 2007/0223917 | A1* | 9/2007 | Nagamine | H04L 41/046 398/1 |
| 2009/0226164 | A1* | 9/2009 | Mayo | H04J 3/14 398/25 |
| 2009/0304380 | A1* | 12/2009 | Sadananda | H04Q 11/0062 398/26 |
| 2009/0323537 | A1* | 12/2009 | Yamamoto | H04L 41/0677 370/242 |
| 2010/0128611 | A1* | 5/2010 | Deguchi | H04L 41/0686 370/242 |
| 2010/0306574 | A1* | 12/2010 | Suzuki | H04L 45/00 714/4.1 |
| 2011/0044163 | A1* | 2/2011 | Nishioka | H04L 45/00 370/217 |
| 2011/0222396 | A1* | 9/2011 | Tochio | H04L 12/437 370/222 |
| 2011/0274435 | A1* | 11/2011 | Fini | G02B 6/02042 398/139 |
| 2012/0287778 | A1* | 11/2012 | Saitoh | H04L 41/0663 370/228 |
| 2013/0121683 | A1* | 5/2013 | Nagamine | H04L 41/0677 398/2 |
| 2013/0182559 | A1* | 7/2013 | Fujioka | H04L 41/0668 370/218 |
| 2013/0259473 | A1* | 10/2013 | Fujii | H04J 14/02 398/48 |
| 2013/0272116 | A1* | 10/2013 | Fujihira | H04L 41/0654 370/228 |
| 2014/0112655 | A1* | 4/2014 | Huang | H04J 14/0291 398/14 |
| 2014/0126899 | A1* | 5/2014 | Prakash | H04B 10/032 398/5 |
| 2014/0169179 | A1* | 6/2014 | Ding | H04L 43/0811 370/241.1 |
| 2014/0241712 | A1* | 8/2014 | Sugawara | G02B 6/02042 398/5 |
| 2014/0297845 | A1* | 10/2014 | Tamura | H04L 43/10 709/224 |
| 2014/0355981 | A1* | 12/2014 | Miyazaki | H04J 14/021 398/38 |
| 2014/0369697 | A1* | 12/2014 | Tsurumi | H04L 1/0083 398/182 |
| 2014/0372601 | A1* | 12/2014 | Suzuki | H04L 41/5022 709/224 |
| 2015/0078744 | A1 | 3/2015 | Ito et al. | |
| 2015/0237421 | A1* | 8/2015 | Morgan | H04Q 11/0005 398/45 |
| 2015/0280998 | A1* | 10/2015 | Kitani | H04L 41/0654 370/254 |
| 2015/0365188 | A1* | 12/2015 | Bamba | H04J 14/0257 398/79 |
| 2016/0020941 | A1* | 1/2016 | Asati | H04L 41/0659 370/228 |
| 2017/0099099 | A1* | 4/2017 | Papakos | H04J 14/021 |

FOREIGN PATENT DOCUMENTS

| | | |
|---|---|---|
| JP | 2013179394 A | 9/2013 |
| JP | 2014022852 A | 2/2014 |
| JP | 2014-165595 A | 9/2014 |
| JP | 2016111480 A | 6/2016 |
| WO | WO-0135582 A1 | 5/2001 |
| WO | WO-2014/141533 A1 | 9/2014 |

OTHER PUBLICATIONS

Shinji Matsuoka, Ultrahigh-speed Ultrahigh-capacity Transport Network Technology for Cost-effective Core and Metro Networks, NTT Technical Journal, Mar. 2011, pp. 8-12 with English version.
Yutaka Miyamoto and Hirokazu Takenouchi, Dense Space-division-multiplexing Optical Communications Technology for Petabit-per-second Class Transmission, NTT Technical Journal, Aug. 2014, pp. 52-56 with English version.

(56) References Cited

OTHER PUBLICATIONS

Kazuyuki Shiraki, R&D Trends in Optical Fiber and Cable Technology, NTT Technical Journal, Jan. 2015, pp. 59-63 with English version.
R. R. Thomson, et al, "Ultrafast-laser inscription of a three dimensional fan-out device for multicore fiber coupling applications", Optics Express, OSA Publishing, 2007, vol. 15, No. 18, pp. 11691-11697.
W. Klaus, et al, "Free-Space Coupling Optics for Multicore Fibers", Photonics Technology Letters, IEEE, 2012, vol. 24, No. 21, pp. 1902-1905.
Japanese Office Action regarding JPSN 2017552658, dated Mar. 12, 2019.
Extended European Search Report regarding EP168685469, dated Jun. 14, 2019.
Japanese Notice of Allowance regarding JPSN 2017552658, dated Sep. 10, 2019.

\* cited by examiner

FIG. 12A

| COMMUNICATION COUNTERPART / FAULT DETECTION SOURCE | TRANSCEIVING NODE 510a | TRANSCEIVING NODE 510b | ADD/DROP NODE 520-1 | ADD/DROP NODE 520-2 | ADD/DROP NODE 520-3 |
|---|---|---|---|---|---|
| TRANSCEIVING NODE 510a | – | – | × | × | × |
| TRANSCEIVING NODE 510b | – | – | ○ | ○ | ○ |
| ADD/DROP NODE 520-1 | × | ○ | – | – | – |
| ADD/DROP NODE 520-2 | × | ○ | – | – | – |
| ADD/DROP NODE 520-3 | × | ○ | – | – | – |

FIG. 12B

| COMMUNICATION COUNTERPART / FAULT DETECTION SOURCE | TRANSCEIVING NODE 510a | TRANSCEIVING NODE 510b | ADD/DROP NODE 520-1 | ADD/DROP NODE 520-2 | ADD/DROP NODE 520-3 |
|---|---|---|---|---|---|
| TRANSCEIVING NODE 510a | – | – | ○ | × | × |
| TRANSCEIVING NODE 510b | – | – | × | ○ | ○ |
| ADD/DROP NODE 520-1 | ○ | × | – | – | – |
| ADD/DROP NODE 520-2 | × | ○ | – | – | – |
| ADD/DROP NODE 520-3 | × | ○ | – | – | – |

FIG. 13A

| COMMUNICATION COUNTERPART / FAULT DETECTION SOURCE | TRANSCEIVING NODE 510a | TRANSCEIVING NODE 510b | ADD/DROP NODE 520-1 | ADD/DROP NODE 520-2 | ADD/DROP NODE 520-3 |
|---|---|---|---|---|---|
| TRANSCEIVING NODE 510a | – | – | ○ | ○ | × |
| TRANSCEIVING NODE 510b | – | – | × | × | ○ |
| ADD/DROP NODE 520-1 | ○ | × | – | – | – |
| ADD/DROP NODE 520-2 | ○ | × | – | – | – |
| ADD/DROP NODE 520-3 | × | ○ | – | – | – |

FIG. 13B

| COMMUNICATION COUNTERPART / FAULT DETECTION SOURCE | TRANSCEIVING NODE 510a | TRANSCEIVING NODE 510b | ADD/DROP NODE 520-1 | ADD/DROP NODE 520-2 | ADD/DROP NODE 520-3 |
|---|---|---|---|---|---|
| TRANSCEIVING NODE 510a | – | – | ○ | ○ | ○ |
| TRANSCEIVING NODE 510b | – | – | × | × | × |
| ADD/DROP NODE 520-1 | ○ | × | – | – | – |
| ADD/DROP NODE 520-2 | ○ | × | – | – | – |
| ADD/DROP NODE 520-3 | ○ | × | – | – | – |

FIG. 15

| No. | FAULT INFORMATION | | | | | | SPECIFIED FAULT LOCATION | | | | FAULT LEVEL |
|---|---|---|---|---|---|---|---|---|---|---|---|
| | A0 | B0 | C0 | A1 | B1 | C1 | F1 | F2 | F3 | F4 | |
| 1 | 0 | 0 | 0 | 0 | 0 | 0 | 0 | 0 | 0 | 0 | ALL SEGMENTS NORMAL |
| 2 | 1 | 1 | 1 | 0 | 0 | 0 | 1 | 0 | 0 | 0 | SINGLE FAULT |
| 3 | 0 | 1 | 1 | 1 | 0 | 0 | 0 | 1 | 0 | 0 | |
| 4 | 0 | 0 | 1 | 1 | 1 | 0 | 0 | 0 | 1 | 0 | |
| 5 | 0 | 0 | 0 | 1 | 1 | 1 | 0 | 0 | 0 | 1 | |
| 6 | 1 | 1 | 1 | 1 | 0 | 0 | 1 | 1 | 0 | 0 | DUAL FAULT |
| 7 | 1 | 1 | 1 | 1 | 1 | 0 | 1 | 0 | 1 | 0 | |
| 8 | 1 | 1 | 1 | 1 | 1 | 1 | 1 | 0 | 0 | 1 | |
| 9 | 0 | 1 | 1 | 1 | 1 | 0 | 0 | 1 | 1 | 0 | |
| 10 | 0 | 1 | 1 | 1 | 1 | 1 | 0 | 1 | 0 | 1 | |
| 11 | 0 | 0 | 1 | 1 | 1 | 1 | 0 | 0 | 1 | 1 | |
| 12 | 1 | 1 | 1 | 1 | 1 | 0 | 1 | 1 | 1 | 0 | TRIPLE FAULT |
| 13 | 1 | 1 | 1 | 1 | 1 | 1 | 1 | 1 | 0 | 1 | |
| 14 | 1 | 1 | 1 | 1 | 1 | 1 | 1 | 0 | 1 | 1 | |
| 15 | 0 | 1 | 1 | 1 | 1 | 1 | 0 | 1 | 1 | 1 | |
| 16 | 1 | 1 | 1 | 1 | 1 | 1 | 1 | 1 | 1 | 1 | QUADRAPLE FAULT |

COMMUNICATION SYSTEM AND FAULT LOCATION SPECIFYING METHOD

TECHNICAL FIELD

The present invention relates to a communication system and a fault location specifying method.

This application is a 371 National Phase of PCT/JP2016/084588, filed on Nov. 22, 2016. Priority is claimed on Japanese Patent Application No. 2015-230875, filed Nov. 26, 2015. The content of both applications is incorporated herein by reference.

BACKGROUND ART

A communication network that uses optical fibers is constructed in a core network that connects together metropolises and a metro network that connects together bases in an area. In such a network, a plurality of optical fibers are used in a bundle. Wavelength division multiplexing (WDM) transmission that involves multiplexing a plurality of optical signals having different wavelengths is performed on respective individual optical fibers to realize high-capacity signal transmission (for example, see Non-Patent Literature 1). In order to further increase the transmission capacity, the use of a multi-core fiber (MCF) which is an optical fiber having a plurality of cores instead of an optical fiber (single core fiber: SCF) having one core has been discussed (for example, see Non-Patent Literatures 2 and 3).

In a network configured using an MCF, since a transmission volume in one MCF is large, a fault in an MCF may have an influence on communication between a plurality of nodes. Due to this, when a fault occurs in a network configured using an MCF, it is necessary to quickly detect the fault and specify a faulty MCF.

CITATION LIST

Non-Patent Literature

[Non-Patent Literature 1]
Shinji Matsuoka, "Ultrahigh-speed Ultrahigh-capacity Transport Network Technology for Cost-effective Core and Metro Networks," NTT Technical Journal, March 2011, pages 8-12

[Non-Patent Literature 2]
Yutaka Miyamoto and Hirokazu Takenouchi, "Dense Space-division-multiplexing Optical Communications Technology for Petabit-per-second Class Transmission," NTT Technical Journal, August 2014, pages 52-56

[Non-Patent Literature 3]
Kazuyuki Shiraki, "R&D Trends in Optical Fiber and Cable Technology," NTT Technical Journal, January 2015, pages 59-63

SUMMARY OF INVENTION

Technical Problem

In view of the above-described problems, an object of the present invention is to provide a communication system and a fault location specifying method capable of detecting faults and specifying fault locations in a network configured using a multi-core fiber.

Solution to Problem

A communication system of a first aspect of the present invention is a communication system includes: three or more nodes, and a multi-core fiber having a plurality of cores, the multi-core fiber being used in at least a partial segment of a connection between the nodes, wherein each of nodes includes: a fault information transmitting device configured to transmit fault information indicating that a fault has occurred in a communication path between one node and another node of the nodes when it is detected that it is not possible to perform communication between the one node and the another node; and a fault location specifying device configured to specify a section between nodes in which a fault has occurred on the basis of the fault information received from the fault information transmitting device provided in each of the nodes.

According to a second aspect of the present invention, in the communication system according to the first aspect, the fault location specifying device is configured to specify the section in which the fault has occurred on the basis of a combination of communication paths in which the fault has occurred, indicated by the fault information received from each of the fault information transmitting devices.

According to a third aspect of the present invention, in the communication system according to the second aspect, the fault location specifying device includes a table in which a combination of the presence of faults in the respective communication paths formed between the nodes and a combination of the presence of faults in the connection between the nodes are associated, wherein the fault location specifying device is configured to detect a combination identical to the combination of the communication paths in which the fault has been detected indicated by the fault information received from each of the fault information transmitting devices from the table, and specify the section between the nodes in which the fault has occurred.

According to a fourth aspect of the present invention, in the communication system according to the third aspect, the fault information transmitting device is configured to transmit fault information including information indicating the communication path in which the fault has not occurred among communication paths between the one node and the other nodes of the nodes to the fault location specifying device, and the fault location specifying device is configured to detect a combination identical to a combination of the presence of faults in the communication paths indicated by the fault information received from each of the fault information transmitting devices from the table and specify the section between the nodes in which the fault has occurred.

According to a fifth aspect of the present invention, in the communication system according to the second aspect, the fault information transmitting device is configured to transmit fault information including information indicating the communication path in which the fault has not occurred among communication paths between the one node and the other nodes of the nodes to the fault location specifying device, and the fault location specifying device is configured to specify the section between the nodes in which the fault has occurred using a predetermined logical formula on the basis of the connection between the nodes and a communication path between the nodes.

A fault location specifying method of a sixth aspect of the present invention is a fault location specifying method in a communication system includes three or more nodes, and a multi-core fiber having a plurality of cores, the multi-core fiber being used in at least a partial segment of a connection between the nodes, the fault location specifying method includes: a first step of transmitting fault information indicating that a fault has occurred in a communication path between one node and another node of the nodes when a fault information transmitting device, which is provided in each of the nodes, detects that it is not possible to perform communication between the one node and the another node; and a second step of specifying, by the fault location specifying device, a section between nodes in which a fault has occurred on the basis of the fault information received from the fault information transmitting device provided in each of the nodes.

Advantageous Effects of Invention

According to the present invention, it is possible to detect faults and specify fault locations in a network configured using a multi-core fiber.

BRIEF DESCRIPTION OF DRAWINGS

FIG. 12A is a first diagram showing a correspondence between a fault location and a combination of presence of a fault indicated by respective pieces of fault information collected from respective nodes.

FIG. 12B is a second diagram showing a correspondence between a fault location and a combination of presence of a fault indicated by respective pieces of fault information collected from respective nodes.

FIG. 13A is a third diagram showing a correspondence between a fault location and a combination of presence of a fault indicated by respective pieces of fault information collected from respective nodes.

FIG. 13B is a fourth diagram showing a correspondence between a fault location and a combination of presence of a fault indicated by respective pieces of fault information collected from respective nodes.

FIG. 15 is a diagram showing an example of a fault determination table stored in a fault location specifying device of the present embodiment.

DESCRIPTION OF EMBODIMENTS

Figure 1:
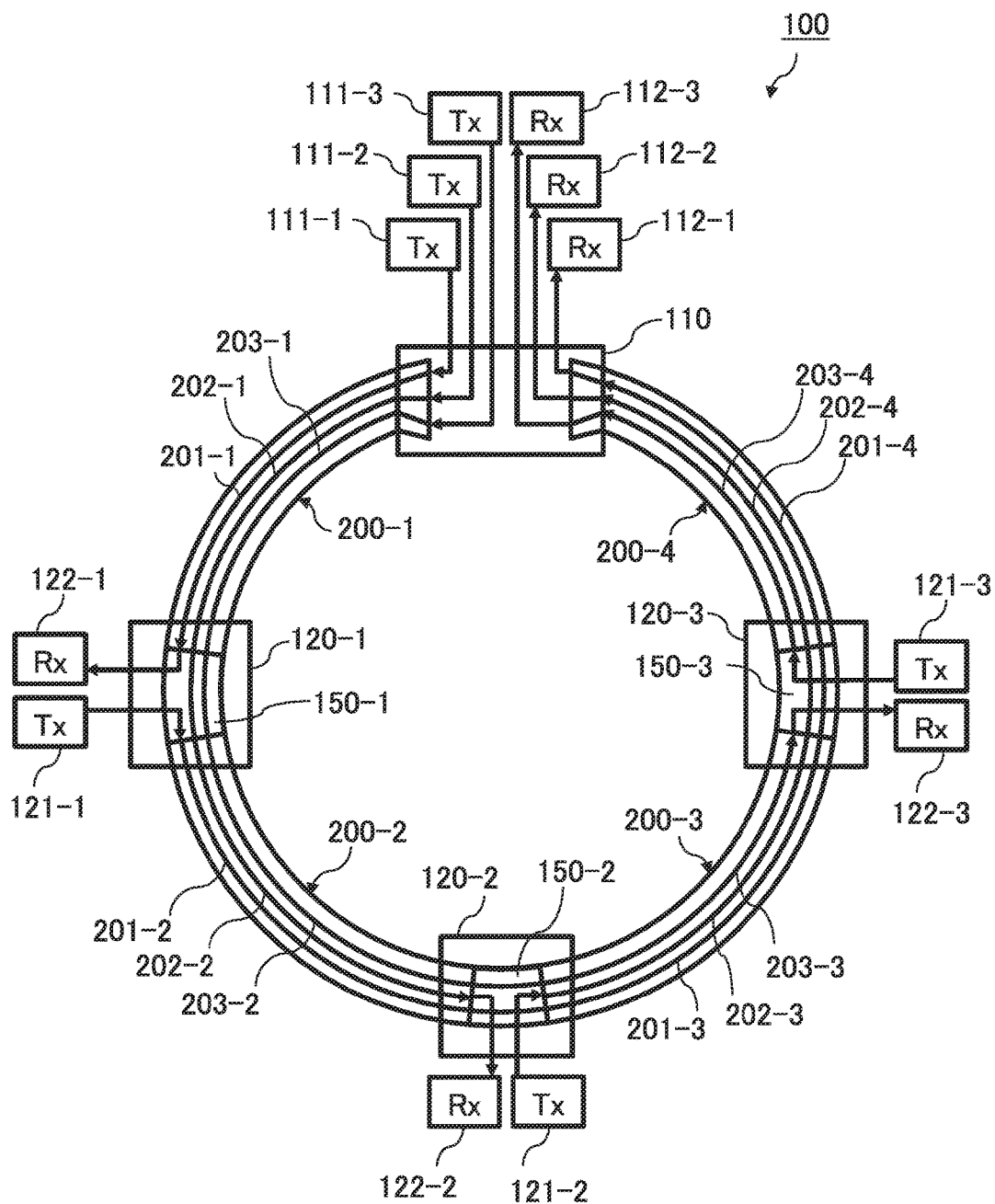
FIG. 1 is a diagram showing a first configuration example of a communication system according to the present invention.

Hereinafter, a communication system and a fault location specifying method according to an embodiment of the present invention will be described with reference to the drawings. In the following embodiments, elements denoted by the same reference numerals perform similar operations and redundant description thereof will be omitted appropriately.

First, an example of a communication system to which an embodiment of the present invention can be applied and which uses a multi-core fiber (MCF) will be described. FIG. 1 is a diagram showing a configuration example of a communication system 100 which uses an MCF according to the present invention. The communication system 100 includes a transceiving node 110 and n Add/Drop nodes 120, n being an integer of 1 or more. FIG. 1 shows a configuration example of the communication system 100 when n=3. In the following description, the respective n Add/Drop nodes 120 will be referred to as Add/Drop nodes 120-1 to 120-$n$. Moreover, the transceiving node 110 and the Add/Drop node 120 will be collectively referred to as a "node." In the following description, a transmitting device, a receiving device, a transceiving device, and the like that perform communication using optical signals and nodes will be described as individual configurations. However, a node may include a transmitting device, a receiving device, a transceiving device, and the like.

Nodes are connected together by multi-core fibers (MCFs) 200-1 to 200-4. The communication system 100 has a physical topology of a single-system one-way ring configuration in which the nodes are connected together by the MCFs 200-1 to 200-4. The transceiving node 110 and the Add/Drop node 120-1 are connected together by the MCF 200-1. The Add/Drop node 120-1 and the Add/Drop node 120-2 are connected together by the MCF 200-2. The Add/Drop node 120-2 and the Add/Drop node 120-3 are connected together by the MCF 200-3. The Add/Drop node 120-3 and the transceiving node 110 are connected together by the MCF 200-4. Each of the MCFs 200-1 to 200-4 of the communication system 100 has three cores 201, 202, and 203.

To generalize the description of the configuration of the communication system 100, an Add/Drop node 120-$i$ ($1 \leq i \leq n-1$) is connected to an Add/Drop node 120-$(i+1)$ by an MCF 200-$(i+1)$. The MCF 200-1 connects together the transceiving node 110 and the Add/Drop node 120-1. The MCF 200-$(n+1)$ connects together the Add/Drop node 120-$n$ and the transceiving node 110.

Each node of the communication system 100 includes a transmitting device (Tx) and a receiving device (Rx) that perform communication between the nodes. Transmitting devices 111-1 to 111-3 and receiving devices 112-1 to 112-3 are provided in the transceiving node 110. A transmitting device 121-1 and a receiving device 122-1 are provided in the Add/Drop node 120-1. A transmitting device 121-2 and a receiving device 122-2 are provided in the Add/Drop node 120-2. A transmitting device 121-3 and a receiving device 122-3 are provided in the Add/Drop node 120-3. The transmitting devices 111-1 to 111-3 generate optical signals to be transmitted to the Add/Drop nodes 120-1 to 120-3, respectively. The receiving devices 112-1 to 112-3 receive optical signals transmitted from the Add/Drop nodes 120-1 to 120-3 and acquire information included in the optical signals. The transmitting devices 121-1 to 121-3 generate optical signals to be transmitted to the transceiving node 110. The receiving devices 122-1 to 122-3 receive optical signals transmitted from the transceiving node 110 and acquire information included in the optical signals.

The transmitting devices 111-1 to 111-3 generate optical signals addressed to the Add/Drop nodes 120-1 to 120-3, respectively. The three optical signals generated by the transmitting devices 111-1 to 111-3 are added to the cores 201-1 to 203-1 of the MCF 200-1, respectively. The receiving devices 112-1 to 112-3 receive optical signals transmitted from the Add/Drop nodes 120-1, 120-2, and 120-3 to nodes included in the receiving devices, respectively. The receiving devices 112-1 to 112-3 receive optical signals from the Add/Drop nodes 120-1 to 120-3 via the cores 201-4 to 203-4 of the MCF 200-4. A fan-in device or a fan-out device is used for adding optical signals to the MCF 200 and dropping optical signals from the MCF 200 in the transceiving node 110.

The fan-in device is a device which is connected to each of the cores in a multi-core fiber and which adds optical signals to the cores. The fan-out device is a device which is connected to each of the cores in a multi-core fiber and which drops each of optical signals propagating through the cores. Since the only difference between the devices is that the propagating directions of optical signals are different, input and output of optical signals to and from a multi-core fiber may be performed using any one of the fan-in device and the fan-out device. Moreover, adding of optical signals addressed to a multi-core fiber and dropping of optical signals from the multi-core fiber may be performed simultaneously using one device.

Connectors 150-1 to 150-3 are provided in the Add/Drop nodes 120-1 to 120-3, respectively. A connector 150-*i* of an Add/Drop node 120-*i* (i=1, 2, 3) is connected to an MCF 200-*i* and an MCF 200-(*i*+1). A connector 150-*i* drops an optical signal addressed to a subject node among the optical signals added in the transceiving node 110 from the MCF 200-*i*. Moreover, the connector 150-*i* adds optical signals addressed to the transceiving node 110 to the cores of the MCF 200-(*i*+1).

In the Add/Drop node 120-1, the connector 150-1 drops an optical signal addressed to the subject node from the core 201-1 of the MCF 200-1. The connector 150-1 connects the dropped optical signal to the receiving device 122-1. Moreover, the connector 150-1 adds an optical signal generated by the transmitting device 121-1 to the core 201-2 of the MCF 200-2. The optical signal added to the core 201-2 is an optical signal transmitted from the Add/Drop node 120-1 to the transceiving node 110.

The connector 150-1 connects the cores 202-1 and 203-1 among the cores of the MCF 200-1 to the cores 202-2 and 203-2 among the cores of the MCF 200-2. The connector 150-1 relays optical signals between the MCF 200-1 and the MCF 200-2. The connector 150-1 relays optical signals transmitted through cores other than the cores 201-1 and 201-2 that add or drop optical signals.

In the Add/Drop node 120-2, the connector 150-2 drops an optical signal addressed to the subject node from the core 202-2 of the MCF 200-2. The connector 150-2 connects the dropped optical signal to the receiving device 122-2. Moreover, the connector 150-2 adds an optical signal generated by the transmitting device 121-2 to the core 202-3 of the MCF 200-3. The optical signal added to the core 202-3 is an optical signal transmitted from the Add/Drop node 120-2 to the transceiving node 110.

The connector 150-2 connects the cores 201-2 and 203-2 among the cores of the MCF 200-2 to the cores 201-3 and 203-3 among the cores of the MCF 200-3. The connector 150-2 relays optical signals between the MCF 200-2 and the MCF 200-3. The connector 150-2 relays optical signals transmitted through cores other than the cores 201-2 and 201-3 that add or drop optical signals.

In the Add/Drop node 120-3, the connector 150-3 drops an optical signal addressed to the subject node from the core 203-3 of the MCF 200-3. The connector 150-3 connects the dropped optical signal to the receiving device 122-3. Moreover, the connector 150-3 adds an optical signal generated by the transmitting device 121-3 to the core 203-4 of the MCF 200-4. The optical signal added to the core 203-4 is an optical signal transmitted from the Add/Drop node 120-3 to the transceiving node 110.

The connector 150-3 connects the cores 201-3 and 202-3 among the cores of the MCF 200-3 to the cores 201-4 and 202-4 among the cores of the MCF 200-4. The connector 150-3 relays optical signals between the MCF 200-3 and the MCF 200-4. The connector 150-3 relays optical signals transmitted through cores other than the cores 203-3 and 203-4 that add or drop optical signals.

Figure 2A:
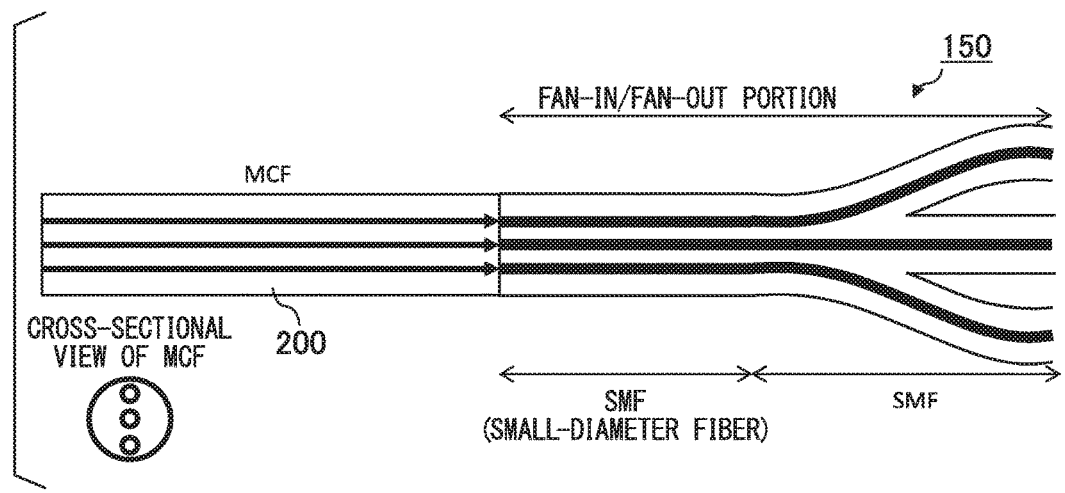
FIG. 2A is a diagram showing a first configuration example of a connector used in a communication system.
Figure 2B:
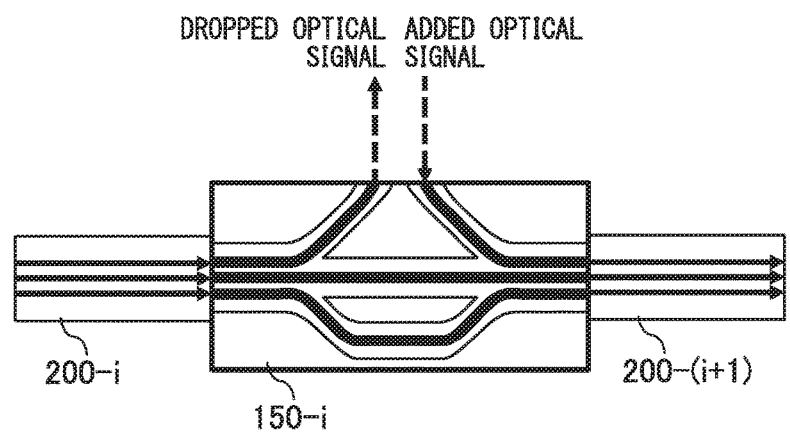
FIG. 2B is a diagram showing the first configuration example of a connector used in a communication system.

FIGS. 2A and 2B are diagrams showing a first configuration example of the connector 150 used in the communication system 100. The connector 150 includes a fan-in/fan-out portion including a plurality of small-diameter single-mode fibers (SMFs) and a plurality of SMFs. As shown in FIG. 2A, the connector 150 includes a small-diameter SMF for each of the cores of a connection target MCF 200. One set of ends of the plurality of small-diameter SMFs are provided at positions facing the cores of the MCF 200. Moreover, the other set of ends of the plurality of small-diameter SMFs are provided at positions facing one set of ends of the SMFs. Each of the small-diameter SMFs connects together the SMF and the core of the MCF 200. The connector 150 can drop optical signals transmitted through the respective cores of the MCF 200 via the small-diameter SMF and the SMF. Moreover, by inputting optical signals to the SMF, it is possible to input optical signals to the cores of the MCF 200.

The connector 150-*i* shown in FIG. 2B connects the MCF 200-*i* and the MCF 200-(*i*+1). The other set of ends of SMFs corresponding to cores that transmit optical signals that are an Add/Drop target are drawn out to a side surface of the connector 150-*i*. At the other set of ends of the SMFs drawn out to the side surface of the connector 150-*i*, adding and dropping (Add/Drop) of the optical signal can be performed.

The other set of ends of the SMFs corresponding to cores that transmit optical signals which are not the Add/Drop target among the cores of the MCF 200-*i* and the other set of ends of the SMFs corresponding to cores that transmit optical signals which are not the Add/Drop target among the cores of the MCF 200-(*i*+1) are provided at positions facing each other. In the connector 150-*i*, optical signals that are not the Add/Drop target are relayed from the MCF 200-*i* to the MCF 200-(*i*+1) via the small-diameter SMFs and the SMFs.

Figure 3A:
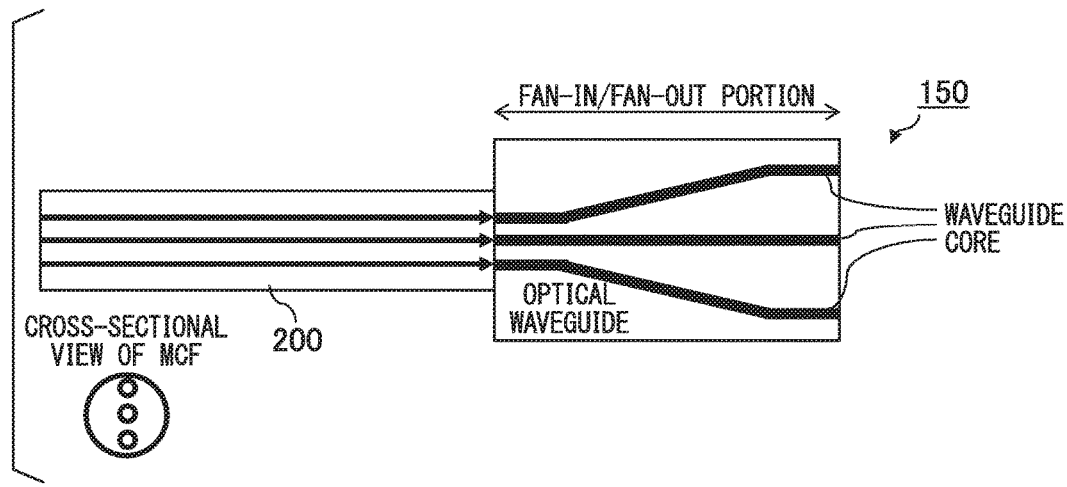
FIG. 3A is a diagram showing a second configuration example of a connector used in a communication system.
Figure 3B:
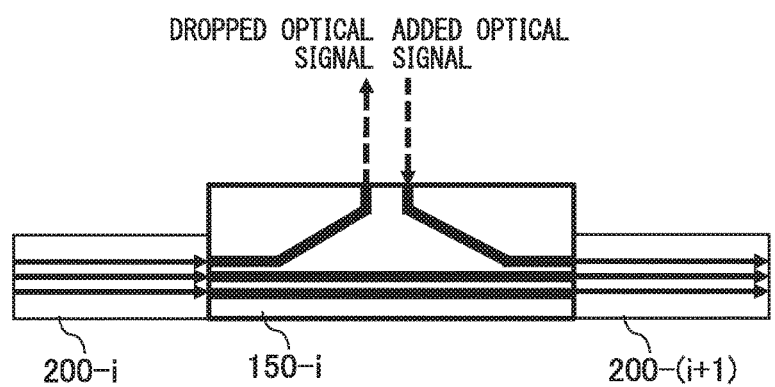
FIG. 3B is a diagram showing the second configuration example of a connector used in a communication system.

FIGS. 3A and 3B are diagrams showing a second configuration example of the connector 150 used in the communication system 100. FIGS. 3A and 3B show a configuration example different from the configuration example of the connector 150 shown in FIGS. 2A and 2B. The connector 150 shown in FIGS. 3A and 3B includes an optical waveguide including a plurality of waveguide cores formed on a glass substrate as a fan-in/fan-out portion. As shown in FIG. 3A, in the connector 150, the plurality of waveguide cores are provided at positions facing the cores of a connection target MCF 200. Optical signals transmitted through the respective cores of the MCF 200 are split via the waveguide cores. Moreover, by adding optical signals to the waveguide cores, it is possible to input optical signals to the respective cores of the MCF 200.

In the connector 150-$i$ shown in FIG. 3B, one set of ends of waveguide cores corresponding to the cores that transmit optical signals which are the Add/Drop target among the cores of the MCF 200-$i$ and the MCF 200-($i$+1) connected by the connector 150-$i$ are provided at positions facing the cores of the MCFs. The other set of ends of the waveguide cores are provided on a side surface of the connector 150-$i$. At the other set of ends of the waveguide cores positioned on the side surface of the connector 150-$i$, adding and dropping of optical signals can be performed.

One set of ends of the waveguide cores corresponding to the cores that transmit optical signals that are not the Add/Drop target among the cores of the MCF 200-$i$ are provided at positions facing the cores of the MCFs. The other set of ends of the waveguide cores are provided at positions facing the cores that transmit optical signals that are not the Add/Drop target among the cores of the MCF 200-($i$+1). The cores that transmit optical signals that are not the Add/Drop target in the MCF 200-$i$ and the MCF 200-($i$+1) are connected to waveguide cores in a one-to-one relationship. In the connector 150-$i$, the optical signals that are not the Add/Drop target are relayed from the cores of the MCF 200-$i$ to the cores of the MCF 200-($i$+1) via the waveguide cores.

The waveguide cores may be formed in a three-dimensional space as disclosed in Reference Document 1 as well as being formed in a two-dimensional space of a substrate plane.

[Reference Document 1]

R. R. Thomson, et al., "Ultrafast-laser inscription of a three dimensional fan-out device for multicore fiber coupling applications," Optics Express, OSA Publishing, 2007, Vol. 15, Issue 18, p. 11691-11697

Figure 4A:
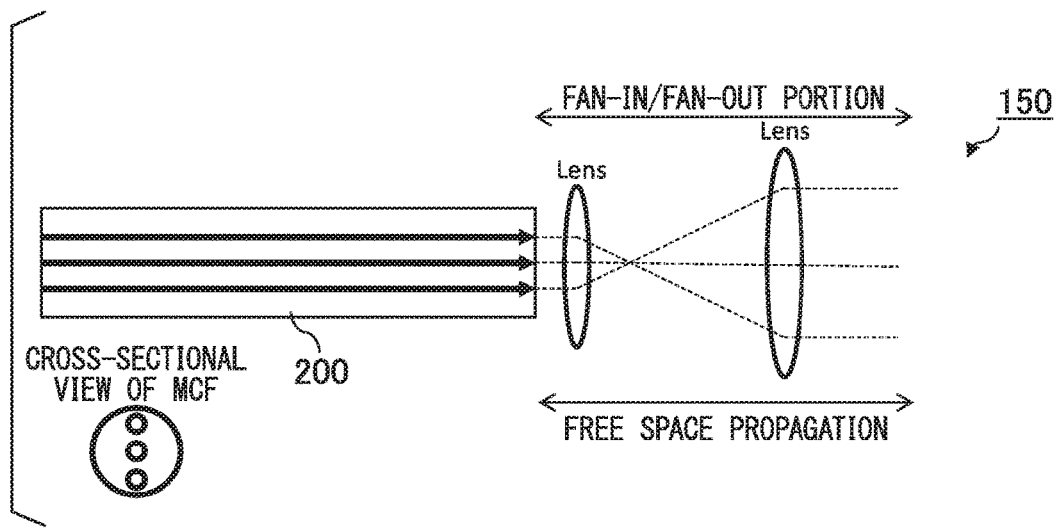
FIG. 4A is a diagram showing a third configuration example of a connector used in a communication system.
Figure 4B:
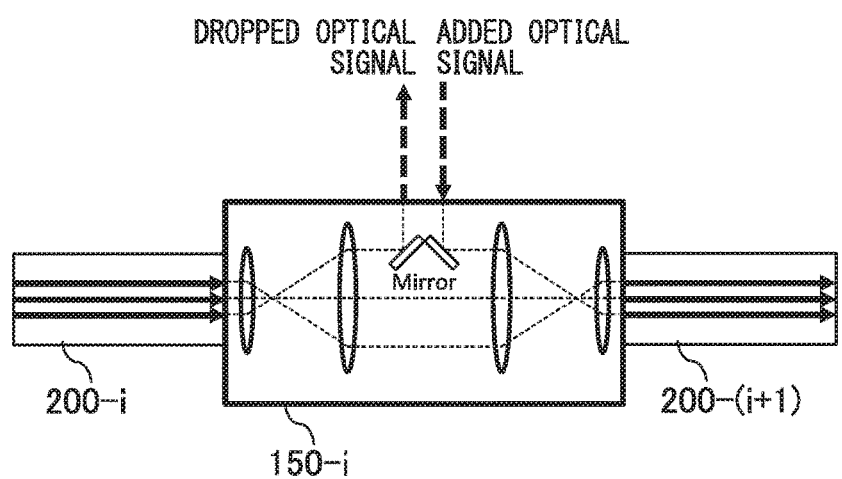
FIG. 4B is a diagram showing the third configuration example of a connector used in a communication system.

FIGS. 4A and 4B are diagrams showing a third configuration example of the connector 150 used in the communication system 100. FIGS. 4A and 4B show a configuration example different from the configuration example of the connector 150 shown in FIGS. 2A, 2B, 3A, and 3B. The connector 150 shown in FIGS. 4A and 4B causes optical signals transmitted through the respective cores of the MCF 200 to be output to a free space and causes the optical signals of the respective cores in the free space to be split by an optical system. For example, as shown in FIG. 4A, the connector 150 includes a fan-in/fan-out portion formed of two lenses. The optical signals transmitted through the respective cores of the MCF 200 are output to the free space and are split by being refracted by the two lenses. Add/Drop of optical signals is performed using an optical system. Connection together of two MCFs 200 via a free space is disclosed in Reference Document 2, for example.

[Reference Document 2]

W. Klaus, et al., "Free-Space Coupling Optics for Multicore Fibers," Photonics Technology Letters, IEEE, September 2012, Volume 24, Issue 21, p. 1902-1905

FIG. 4B is a diagram showing a configuration example of the connector 150-$i$. In the connector 150-$i$ shown in FIG. 4B, the optical signals output from the respective cores of the MCF 200-$i$ are collimated by an optical system (a collimator) formed by combining two lenses. Moreover, the collimated optical signals are input to the respective cores of the MCF 200-($i$+1). A mirror that changes an optical path toward a side surface of the connector 150-$i$ is disposed in an optical path of optical signals which are the Add/Drop target. A splitting target optical signal among the optical signals which are converted to parallel light by the optical system is reflected from a mirror and is dropped to the outside of the connector 150-$i$, whereby the splitting target optical signal can be obtained. Moreover, by causing optical signals input from the outside of the connector 150-$i$ to strike the mirror, the optical signals reflected from the mirror are incident on the optical system obtained by combining two lenses together with the collimated optical signals. When the optical signals incident on the optical system are connected to the cores of the MCF 200-($i$+1), Add target optical signals can be added to the cores.

Optical signals that are not the Add/Drop target are bundled together with the added optical signals after being split by the optical system and are input to the respective cores of the MCF 200-($i$+1). In the connector 150-$i$, the optical signals that are not the Add/Drop target are relayed from the MCF 200-$i$ to the MCF 200-($i$+1) via a free space. Although two lenses are used for collimating light output from the fiber and a mirror is used for changing the propagating direction of light in the free space in the drawings, an optical device having the same function may be used.

Although FIGS. 2A, 2B, 3A, 3B, 4A, and 4B show a configuration example of the connector 150, the connector 150 may be realized using a medium and a method other than those described above. For example, a planar lightwave circuit (PLC) having an optical waveguide formed on a silicon may be used as a connector.

In the communication system 100, optical signals generated by the transmitting device 111-1 of the transceiving node 110 are received by the receiving device 122-1 of the Add/Drop node 120-1 via the core 201-1 of the MCF 200-1 and the connector 150-1. The optical signals generated by the transmitting device 111-2 are received by the receiving device 122-2 of the Add/Drop node 120-2 via the core 202-1 of the MCF 200-1, the connector 150-1, the core 202-2 of the MCF 200-2, and the connector 150-2. The optical signals generated by the transmitting device 111-3 are received by the receiving device 122-3 of the Add/Drop node 120-3 via the core 203-1 of the MCF 200-1, the connector 150-1, the core 203-2 of the MCF 200-2, the connector 150-2, the core 203-3 of the MCF 200-3, and the connector 150-3.

Moreover, the optical signals generated by the transmitting device 121-1 of the Add/Drop node 120-1 are received by the receiving device 112-1 of the transceiving node 110 via the connector 150-1, the core 201-2 of the MCF 200-2, the connector 150-2, the core 201-3 of the MCF 200-3, the connector 150-3, and the core 201-4 of the MCF 200-4. The optical signals generated by the transmitting device 121-2 of the Add/Drop node 120-2 are received by the receiving device 112-2 of the transceiving node 110 via the connector 150-2, the core 202-3 of the MCF 200-3, the connector 150-3, and the core 202-4 of the MCF 200-4. The optical signals generated by the transmitting device 121-3 of the Add/Drop node 120-3 are received by the receiving device 112-3 of the transceiving node 110 via the connector 150-3 and the core 203-4 of the MCF 200-4.

In the communication system 100, the transceiving node 110 has communication paths for transmitting and receiving signals to and from the Add/Drop nodes 120-1 to 120-3. The communication system 100 has a star-type logical topology around the transceiving node 110.

For example, by connecting together the MCFs 200 at each node using any one of the connectors 150 shown in FIGS. 2A, 2B, 3A, 3B, 4A, and 4B, it is possible to add and drop optical signal to and from predetermined core among a plurality of cores included in the MCF 200. In the communication system 100, by connecting the MCF 200-$i$ and the MCF 200-($i$+1) via the connector 150-$i$, it is possible to easily drop optical signals addressed to the Add/Drop node 120-$i$ and add optical signals addressed to the transceiving node 110. Since a process of dividing multiplexed optical signals having different wavelengths in respective wavelengths is not required in adding or dropping optical signals, it is possible to reduce the time and labor for installation and maintenance of devices in the Add/Drop node 120.

Although a case in which the MCF 200 has three cores has been described, the MCF 200 may have four or more cores. When the MCF 200 has four or more cores, optical signals may be added and dropped for two or more cores of the Add/Drop node 120.

Figure 5:
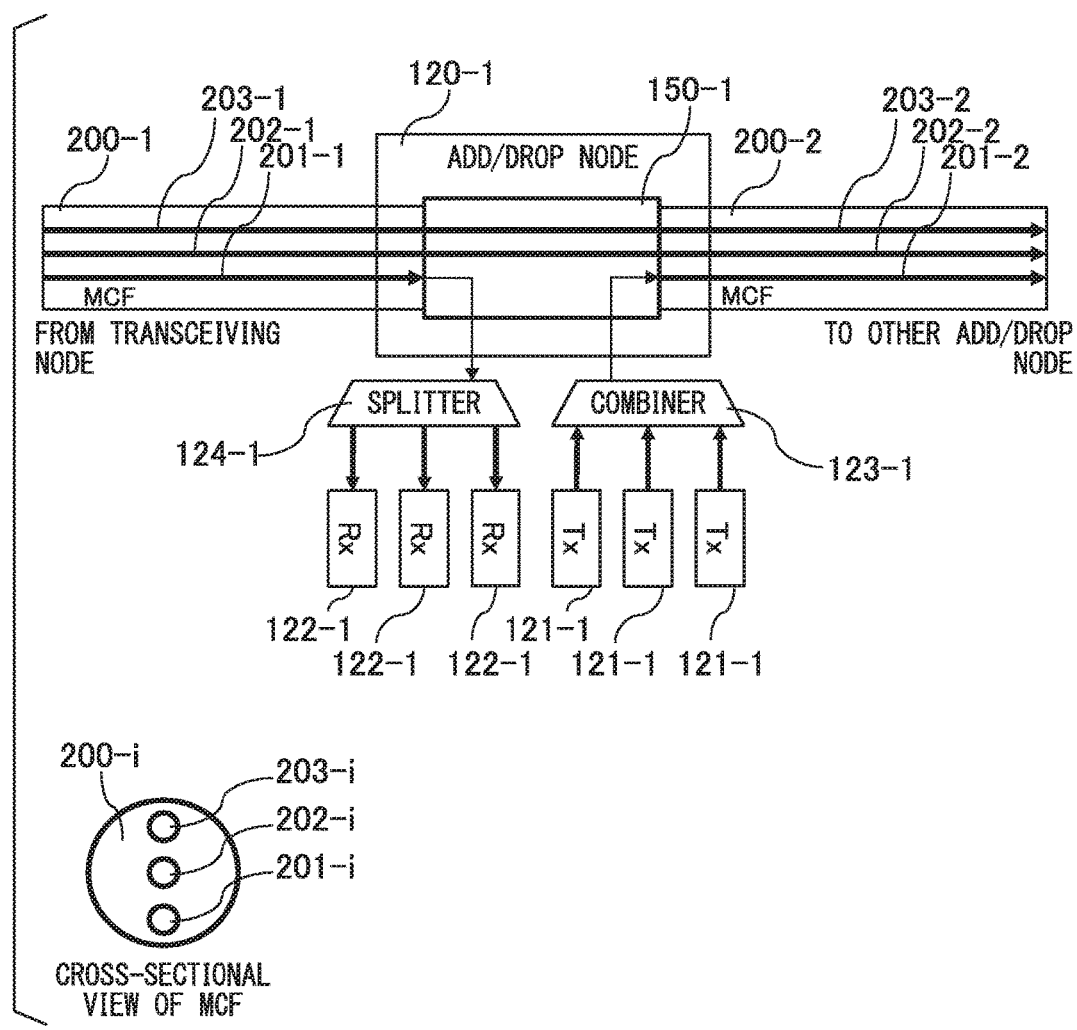
FIG. 5 is a diagram showing a first configuration example of an Add/Drop node when WDM transmission is performed in a communication system.

Moreover, WDM transmission may be performed in each core of the MCF 200. When WDM transmission is performed, optical signals of respective wavelengths need to be split and combined in the Add/Drop node 120. FIG. 5 is a diagram showing a configuration example of the Add/Drop node 120-1 when the communication system 100 performs WDM transmission. The Add/Drop node 120-1 includes a connector 150-1, a splitter 124-1, a combiner 123-1, a plurality of receiving devices 122-1, and a plurality of transmitting devices 121-1.

An optical signal dropped from the core 201-1 of the MCF 200-1 of the connector 150-1 is input to the splitter 124-1. The splitter 124-1 splits the input optical signal in respective wavelengths. The optical signals obtained by splitting are received by the receiving devices 122-1, respectively. The optical signals having different wavelengths generated by the plurality of transmitting devices 121-1 are input to the combiner 123-1. The combiner 123-1 combines the input optical signals and outputs the combined optical signal to the connector 150-1. The connector 150-1 connects the optical signal input from the combiner 123-1 to the core 201-2 of the MCF 200-2 to add the optical signal addressed to the transceiving node 110 to the MCF 200-2.

Even when WDM transmission is performed, the optical signals of the cores 202-1 and 203-1 of the MCF 200-1, which are not the Add/Drop target, are relayed to the cores 202-2 and 203-2 of the MCF 200-2. Due to this, as for optical signals to be relayed, it is not necessary to split and combine optical signals in respective wavelengths at each Add/Drop node. When WDM transmission is performed, the other Add/Drop nodes 120 have a configuration similar to that of the Add/Drop node 120-1.

Figure 6:
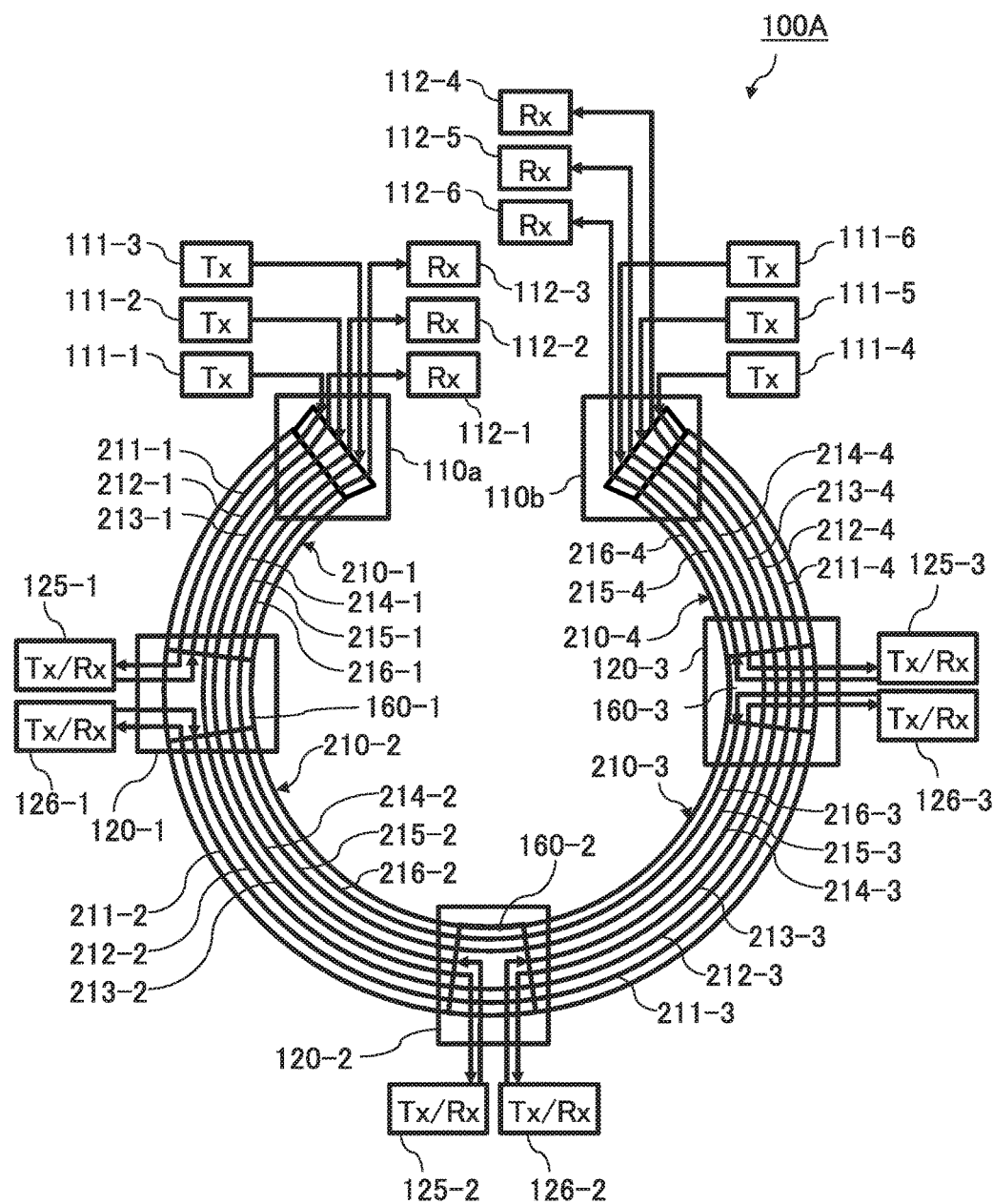
FIG. 6 is a diagram showing a second configuration example of the communication system according to the present invention.

A communication system having a different configuration from the communication system 100 shown in FIG. 1 will be described. FIG. 6 is a diagram showing a configuration example of a communication system 100A which uses the MCF according to the present invention. The communication system 100A includes transceiving nodes 110$a$ and 110$b$ and $n$ Add/Drop nodes 120. FIG. 6 shows a configuration example of the communication system 100A when n=3. The communication system 100A is different from the communication system 100 in that the communication system 100A has a physical topology of a dual-system one-way ring configuration.

Nodes are connected together by MCFs 210-1 to 210-4. The transceiving node 110$a$ and the Add/Drop node 120-1 are connected together by the MCF 210-1. The Add/Drop node 120-1 and the Add/Drop node 120-2 are connected together by the MCF 210-2. The Add/Drop node 120-2 and the Add/Drop node 120-3 are connected together by the MCF 210-3. The Add/Drop node 120-3 and the transceiving node 110$b$ are connected together by the MCF 210-4. The MCFs 210-1 to 210-4 of the communication system 100A include six cores 211 to 216.

When the description of the configuration of the communication system 100A is generalized, an Add/Drop node 120-$i$ ($1 \leq i \leq n-1$) is connected to an Add/Drop node 120-($i$+1) by an MCF 210-($i$+1). The MCF 210-1 connects together the transceiving node 110$a$ and the Add/Drop node 120-1. The MCF 210-($n$+1) connects together the Add/Drop node 120-$n$ and the transceiving node 110$b$.

Each node of the communication system 100A includes either a transmitting device (Tx) and a receiving device (Rx) that perform communication between nodes or a transceiving device (Tx/Rx). Transmitting devices 111-1 to 111-3 and receiving devices 112-1 to 112-3 are provided in the transceiving node 110$a$. Transceiving devices 125-1 and 126-1 are provided in the Add/Drop node 120-1. Transceiving devices 125-2 and 126-2 are provided in the Add/Drop node 120-2. Transceiving devices 125-3 and 126-3 are provided in the Add/Drop node 120-3. Transmitting devices 111-4 to 111-6 and receiving devices 112-4 to 112-6 are provided in the transceiving node 110$b$. In the configuration example of the communication system 100A shown in FIG. 6, a configuration in which the transmitting device 111 and the receiving device 112 are provided in the transceiving nodes 110$a$ and 110$b$, and the transceiving devices 125 and 126 are provided in the Add/Drop nodes 120-1 to 120-3 will be described. However, the transceiving devices 125 and 126 have the functions of both a transmitting device and a receiving device therein, and there is no great difference between the transceiving device and a combination of the transmitting device and the receiving device. Either a transmitting device and a receiving device or a transceiving device may be provided in the transceiving nodes 110$a$ and 110$b$ and the Add/Drop nodes 120-1 to 120-3.

The transmitting devices 111-1 to 111-3 generate optical signals to be transmitted to the Add/Drop nodes 120-1 to 120-3, respectively. The optical signals generated by the transmitting devices 111-1 to 111-3 are added to the cores 211-1, 213-1, and 215-1 of the MCF 210-1, respectively. The receiving devices 112-1 to 112-3 receive optical signals transmitted from the Add/Drop nodes 120-1 to 120-3 to the transceiving node 110$a$, respectively. The receiving devices 112-1 to 112-3 receive optical signals from the cores 212-1, 214-1, and 216-1 of the MCF 210-1, respectively.

The transmitting devices 111-4 to 111-6 generate optical signals to be transmitted to the Add/Drop nodes 120-1 to 120-3, respectively. The optical signals generated by the transmitting devices 111-4 to 111-6 are added to the cores 211-4, 213-4, and 215-4 of the MCF 210-4, respectively. The receiving devices 112-4 to 112-6 receive optical signals transmitted from the Add/Drop nodes 120-1 to 120-3 to the transceiving node 110$b$, respectively. The receiving devices 112-4 to 112-6 receive optical signals from the cores 212-4, 214-4, and 216-4 of the MCF 210-4, respectively. In the transceiving nodes 110$a$ and 110$b$, a fan-in device or a fan-out device is used for adding optical signals to the MCF 200 and dropping optical signals from the MCF 200.

A connector 160-*i* is provided in each Add/Drop node 120-*i* (*i*=1, 2, 3). The connector 160-*i* is connected to the MCF 210-*i* and the MCF 210-(*i*+1). The connector 160-*i* drops optical signals addressed to the subject node among the optical signals added in the transceiving nodes 110*a* and 110*b* from the MCF 210-*i* and the MCF 210-(*i*+1). The connector 160-*i* adds an optical signal addressed to the transceiving node 110*a* to the cores of the MCF 210-*i*. The connector 160-*i* adds an optical signal addressed to the transceiving node 110*b* to the cores of the MCF 210-(*i*+1).

In the Add/Drop node 120-1, the connector 160-1 drops an optical signal addressed to the subject node from the core 211-1 of the MCF 210-1. The connector 160-1 connects the dropped optical signal to the transceiving device 125-1. Moreover, the connector 160-1 adds an optical signal generated by the transceiving device 125-1 to the core 212-1 of the MCF 210-1. The optical signal added to the core 212-1 is an optical signal which is transmitted from the subject node to the transceiving node 110*a*.

Furthermore, the connector 160-1 drops an optical signal addressed to the subject node from the core 211-2 of the MCF 210-2. The connector 160-1 connects the dropped optical signal to the transceiving device 126-1. Moreover, the connector 160-1 adds an optical signal generated by the transceiving device 126-1 to the core 212-2 of the MCF 210-2. The optical signal added to the core 212-2 is an optical signal that is transmitted from the subject node to the transceiving node 110*b*.

The connector 160-1 connects the cores 213-1 to 216-1 among the cores of the MCF 210-1 to the cores 213-2 to 216-2 among the cores of the MCF 210-2, respectively. The connector 160-1 relays optical signals between the MCF 210-1 and the MCF 210-2. The connector 160-1 relays optical signals transmitted through cores other than the cores 211-1, 212-1, 211-2, and 212-2 through which optical signals are added or dropped.

In the Add/Drop node 120-2, the connector 160-2 drops an optical signal addressed to the subject node from the core 213-2 of the MCF 210-2. The connector 160-2 connects the dropped optical signal to the transceiving device 125-2. Moreover, the connector 160-2 adds an optical signal generated by the transceiving device 125-2 to the core 214-2 of the MCF 210-2. The optical signal added to the core 214-2 is an optical signal which is transmitted from the subject node to the transceiving node 110*a*.

Furthermore, the connector 160-2 drops an optical signal addressed to the subject node from the core 213-3 of the MCF 210-3. The connector 160-2 connects the dropped optical signal to the transceiving device 126-2. Moreover, the connector 160-2 adds an optical signal generated by the transceiving device 126-2 to the core 214-3 of the MCF 210-3. The optical signal added to the core 214-3 is an optical signal that is transmitted from the subject node to the transceiving node 110*b*.

The connector 160-2 connects the cores 211-2, 212-2, 215-2, and 216-2 among the cores of the MCF 210-2 to the cores 211-3, 212-3, 215-3, and 216-3 among the cores of the MCF 210-3, respectively. The connector 160-2 relays optical signals between the MCF 210-2 and the MCF 210-3. The connector 160-2 relays optical signals transmitted through cores other than the cores 213-2, 214-2, 213-3, and 214-3 through which optical signals are added or dropped.

In the Add/Drop node 120-3, the connector 160-3 drops an optical signal addressed to the subject node from the core 215-3 of the MCF 210-3. The connector 160-3 connects the dropped optical signal to the transceiving device 126-3. Moreover, the connector 160-3 adds an optical signal generated by the transceiving device 126-3 to the core 216-3 of the MCF 210-3. The optical signal added to the core 216-3 is an optical signal that is transmitted from the subject node to the transceiving node 110*a*.

Furthermore, the connector 160-3 drops an optical signal addressed to the subject node from the core 215-4 of the MCF 210-4. The connector 160-4 connects the dropped optical signal to the transceiving device 125-3. Moreover, the connector 160-3 adds an optical signal generated by the transceiving device 125-3 to the core 216-3 of the MCF 210-4. The optical signal added to the core 216-4 is an optical signal that is transmitted from the subject node to the transceiving node 110*b*.

The connector 160-3 connects the cores 211-3 to 214-3 among the cores of the MCF 210-3 to the cores 211-4 to 214-4 among the cores of the MCF 210-4, respectively. The connector 160-3 relays optical signals between the MCF 210-3 and the MCF 210-4. The connector 160-3 relays optical signals transmitted through cores other than the cores 215-3, 216-3, 215-4, and 216-4 through which optical signals are added or dropped.

The connectors 160-1 to 160-3 of the communication system 100A can be configured similarly to the connectors 150-1 to 150-3 of the communication system 100 by using the small-diameter fiber, the optical waveguide, the optical system, and the like as shown in FIGS. 2A, 2B, 3A, 3B, 4A, and 4B.

In the communication system 100A, a transmission communication path and a reception communication path are formed between the transceiving nodes 110*a* and 110*b* and the Add/Drop nodes 120-1 to 120-3. The transceiving nodes 110*a* and 110*b* can communicate with the Add/Drop nodes 120-1 to 120-3 individually. In this manner, the communication system 100A has a tree-type logical topology in which the transceiving nodes 110*a* and 110*b* are used as root nodes.

The Add/Drop nodes 120-1 to 120-3 may use any one of the communication paths between the two transceiving nodes 110*a* and 110*b* as an active system (0-system) and use the other as a standby system (1-system). Moreover, the Add/Drop nodes 120-1 to 120-3 may use a communication path of the shorter transmission path as the 0-system and use a communication path of the longer transmission path as the 1-system. In the Add/Drop nodes 120-1 to 120-3, since a process of dividing multiplexed optical signals having different wavelengths in respective wavelengths is not required in adding or dropping optical signals, it is possible to reduce the time and labor for installation and maintenance of devices.

Although a case in which each MCF 210 has six cores 211 to 216 has been described, the MCF 210 may have seven or more cores. When the MCF 210 has seven or more cores, optical signals may be added and dropped for two or more cores of the Add/Drop node 120.

Moreover, WDM transmission may be performed in each core of the MCF 210. When WDM transmission is performed, as shown in FIG. 5, a splitter or a combiner for optical signals to be added or dropped is provided in each Add/Drop node 120.

Moreover, the transceiving node 110*a* and the transceiving node 110*b* may be connected together using the MCF 210 or a MCF having seven or more cores. In the communication system 100A, when the roles of the transceiving nodes 110*a* and 110*b* and the Add/Drop nodes 120-1 to 120-3 are changed, a logical topology can be easily changed by attaching a connector to the transceiving nodes 110a and 110b and replacing the connector 150 of each of the Add/Drop nodes 120-1 to 120-3 with another connector. In this way, it is possible to flexibly cope with a change in the network configuration.

Figure 7:
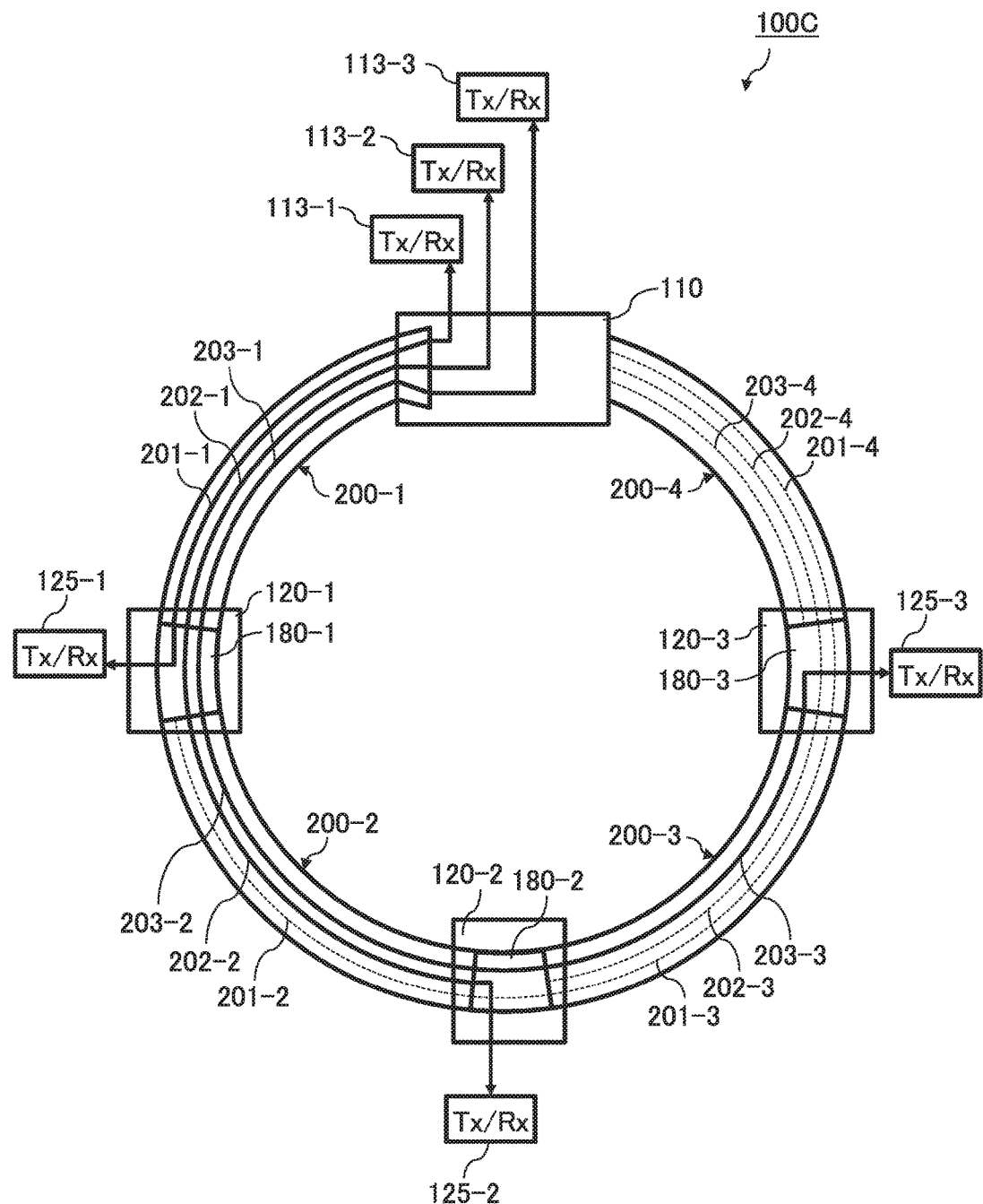
FIG. 7 is a diagram showing a third configuration example of the communication system according to the present invention.

A communication system having a different configuration from the communication systems shown in FIGS. 1 and 6 will be described. FIG. 7 is a diagram showing a configuration example of a communication system 100C which uses the MCF according to the present invention. The communication system 100C includes a transceiving node 110 and n Add/Drop nodes 120. FIG. 7 shows a configuration example of the communication system 100C when n=3. In the communication system 100C, the connection of MCFs 200-1 to 200-4 between nodes is similar to the connection in the communication system 100 shown in FIG. 1. In the communication system 100C, communication from the transceiving node 110 to the respective Add/Drop node 120 and communication from the respective Add/Drop nodes 120 to the transceiving node 110 are performed using the same core. When optical signals of which the transmission directions are different are transmitted using the same core, the strength of optical signals may be suppressed to a certain level or lower in order to suppress the influence of different optical signals of which the transmission directions are different and the wavelengths of optical signals may be different in respective transmission directions. The communication system 100C is different from the communication system 100 of the first embodiment in that the communication system 100C has a physical topology of a single-system two-way ring configuration.

Each node of the communication system 100C includes a transceiving device (Tx/Rx) that performs communication between nodes. Transceiving devices 113-1 to 113-3 are provided in the transceiving node 110. Transceiving devices 125-1 to 125-3 are provided in the Add/Drop nodes 120-1 to 120-3, respectively. The transceiving devices 113-1 to 113-3 generate optical signals to be transmitted to the Add/Drop nodes 120-1 to 120-3, respectively. Moreover, the transceiving devices 113-1 to 113-3 receive optical signals transmitted from the Add/Drop nodes 120-1 to 120-3, respectively, and acquire information included in the optical signals. The transceiving devices 125-1 to 125-3 generate optical signals to be transmitted to the transceiving node 110. Moreover, the transceiving devices 125-1 to 125-3 receive optical signals transmitted from the transceiving node 110 and acquire information included in the optical signals.

The transceiving devices 113-1 to 113-3 generate optical signals to be transmitted to the Add/Drop nodes 120-1 to 120-3, respectively. Three optical signals generated by the transceiving devices 113-1 to 113-3 are added to the cores 201-1 to 203-1 of the MCF 200-1, respectively. Moreover, the transceiving devices 113-1 to 113-3 receive optical signals from the Add/Drop nodes 120-1 to 120-3 via the cores 201-1 to 203-1 of the MCF 200-1, respectively. A fan-in device or a fan-out device is used for adding optical signals to the MCF 200-1 and dropping optical signals from the MCF 200-1.

A connector 180-$i$ is provided in each Add/Drop node 120-$i$ ($i$=1, 2, 3). The connector 180-$i$ is connected to the MCF 200-$i$ and the MCF 200-($i$+1). The connector 180-$i$ drops an optical signal from the core 20$i$-$i$ of the MCF 200-$i$ and connects the dropped optical signal to the transceiving device 125-$i$. Moreover, the connector 180-$i$ adds an optical signal generated by the transceiving device 125-$i$ to the core 20$i$-$i$ of the MCF 200-$i$. The optical signal generated by the transceiving device 125-$i$ is an optical signal transmitted from the Add/Drop node 120-$i$ to the transceiving node 110. The connector 180-$i$ connects the cores 20$i$-$i$ and 20$i$-($i$+1) other than the Add/Drop target cores among the cores of the MCF 200-$i$ and the cores of the MCF 200-($i$+1) to relay optical signals.

The transceiving node 110 and the Add/Drop node 120-1 perform two-way communication using a communication path formed by the core 201-1. The transceiving node 110 and the Add/Drop node 120-2 perform two-way communication using a communication path formed by the cores 202-1 and 202-2. The transceiving node 110 and the Add/Drop node 120-3 perform two-way communication using a communication path formed by the cores 203-1, 203-2, and 203-3. The core 201-2 of the MCF 200-2, the cores 201-3 and 202-3 of the MCF 200-3, and the cores 201-4 to 203-4 of the MCF 200-4 are cores that are not used in communication.

In the communication system 100C, the Add/Drop node 120-3 may perform communication with the transceiving node 110 using the core 201-4 of the MCF 200-4 to shorten a communication path. In this case, a fan-in device and fan-out device are necessary in a connecting portion with the MCF 200-4 in the transceiving node 110.

Moreover, in the communication system 100C, WDM transmission may be performed between the transceiving node 110 and each of the Add/Drop nodes 120-1 to 120-3. When WDM transmission is performed, in the respective Add/Drop nodes 120, an optical signal dropped from a core is split into optical signals of respective wavelengths and the split optical signals are demodulated and decoded. Moreover, as for transmission, after the optical signals of a plurality of different wavelengths are combined into one optical signal, and the optical signal obtained by the combining is added to a core via a connector.

Figure 8:
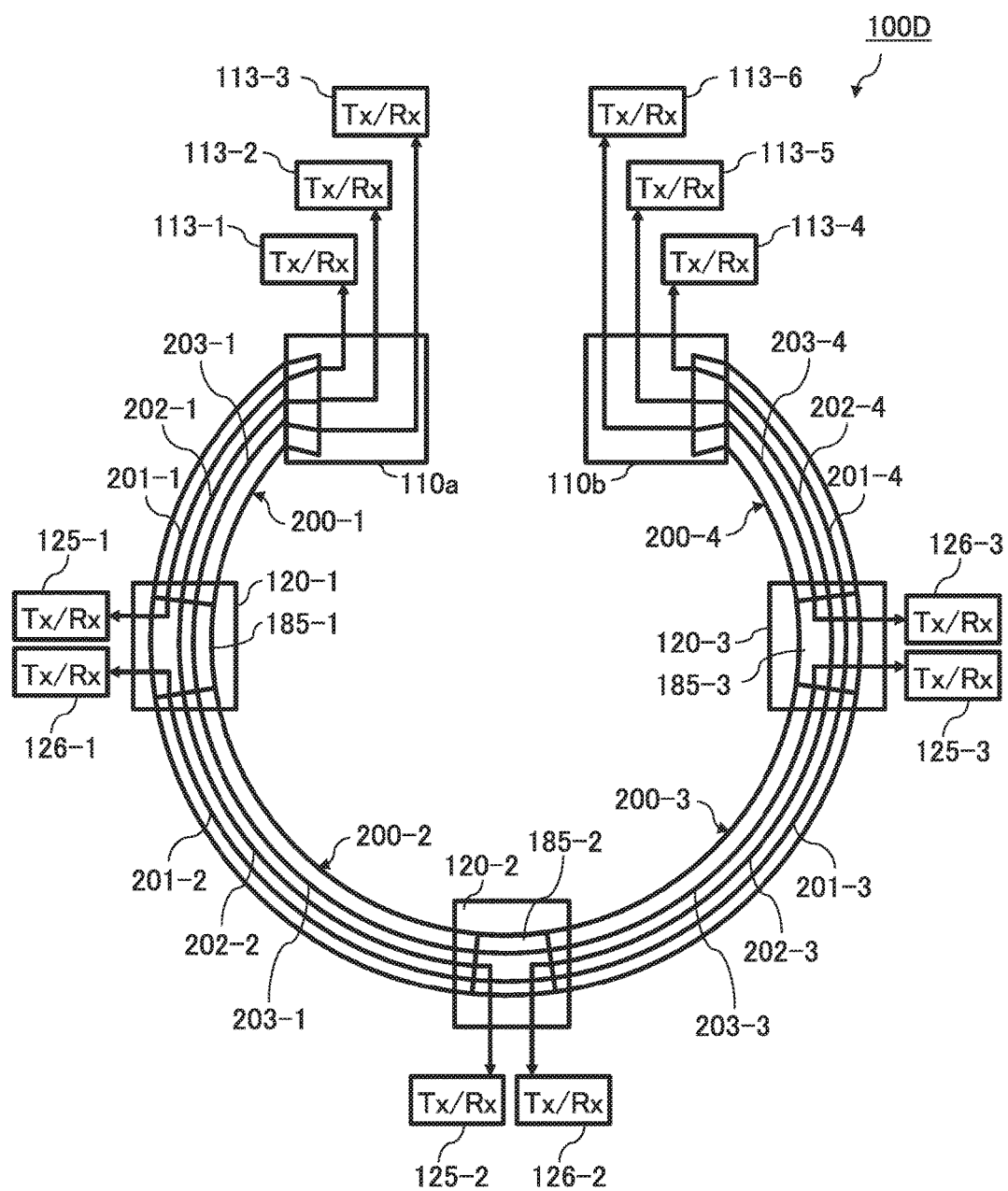
FIG. 8 is a diagram showing a fourth configuration example of a communication system according to the present invention.

A communication system having a different configuration from the communication systems shown in FIGS. 1, 6, and 7 will be described. FIG. 8 is a diagram showing a configuration example of a communication system 100D that uses the MCF according to the present invention. The communication system 100D includes transceiving nodes 110a and 110b and n Add/Drop nodes 120. FIG. 8 shows a configuration example of the communication system 100D when n=3. In the communication system 100D, the connection of the MCFs 200-1 to 200-4 between nodes is similar to the connection of the MCFs 210-1 to 210-4 in the communication system 100A. In the communication system 100D, communication from the transceiving nodes 110a and 110b to the respective Add/Drop nodes 120 and communication from the respective Add/Drop nodes 120 to the transceiving nodes 110a and 110b are performed using the same cores. The communication system 100D has a physical topology of a dual-system two-way ring configuration.

Each node of the communication system 100D includes a transceiving device (Tx/Rx) that performs communication between nodes. Transceiving devices 113-1 to 113-3 are provided in the transceiving node 110a. Transceiving devices 113-4 to 113-6 are provided in the transceiving node 110b. Transceiving devices 125-1 to 125-3 and 126-1 to 126-3 are provided in the Add/Drop nodes 120-1 to 120-3, respectively. The transceiving devices 113-1 to 113-6 generate optical signals to be transmitted to the Add/Drop nodes 120-1 to 120-3, respectively. The transceiving devices 125-1 to 125-3 generate optical signals to be transmitted to the transceiving node 110a. The transceiving devices 126-1 to 126-3 generate optical signals to be transmitted to the transceiving node 110b. Moreover, the transceiving devices 113-1 to 113-6 receive optical signals transmitted from the Add/Drop nodes 120-1 to 120-3, respectively, and acquire information included in the optical signals. The transceiving devices 125-1 to 125-3 receive optical signals transmitted from the transceiving node 110a and acquire information included in the optical signals. The transceiving devices 126-1 to 126-3 receive optical signals transmitted from the transceiving node 110b and acquire information included in the optical signals.

In the transceiving node 110a, the transceiving devices 113-1 to 113-3 generate optical signals to be transmitted to the Add/Drop nodes 120-1 to 120-3, respectively. Three optical signals generated by the transceiving devices 113-1 to 113-3 are added to the cores 201-1 to 203-1 of the MCF 200-1, respectively. Moreover, the transceiving devices 113-1 to 113-3 receive optical signals from the Add/Drop nodes 120-1 to 120-3 via the cores 201-1 to 203-1 of the MCF 200-1, respectively. A fan-in device or a fan-out device is used for adding optical signals to the MCF 200-1 and dropping optical signals from the MCF 200-1.

In the transceiving node 110b, the transceiving devices 113-4 to 113-6 generate optical signals to be transmitted to the Add/Drop nodes 120-1 to 120-3, respectively. Three optical signals generated by the transceiving devices 113-4 to 113-6 are added to the cores 201-4 to 203-4 of the MCF 200-4, respectively. Moreover, the transceiving devices 113-4 to 113-6 receive optical signals from the Add/Drop nodes 120-1 to 120-3 via the cores 201-4 to 203-4 of the MCF 200-4, respectively. A fan-in device or a fan-out device is used for adding optical signals to the MCF 200-4 and dropping optical signals from the MCF 200-4 similarly to the transceiving node 110a.

A connector 185-$i$ is provided in each Add/Drop node 120-$i$ ($i$=1, 2, 3). The connector 185-$i$ is connected to the MCF 200-$i$ and the MCF 200-($i$+1). The connector 185-$i$ drops an optical signal from the core 20$i$-$i$ of the MCF 200-$i$ and connects to the dropped optical signal to the transceiving device 125-$i$. The connector 185-$i$ adds an optical signal generated by the transceiving device 125-$i$ to the core 20$i$-$i$ of the MCF 200-$i$. The optical signal generated by the transceiving device 125-$i$ is an optical signal that is transmitted from the Add/Drop node 120-$i$ to the transceiving node 110a.

Moreover, the connector 185-$i$ drops an optical signal from the core 20$i$-($i$+1) of the MCF 200-($i$+1) and connects the dropped optical signal to the transceiving device 126-$i$. The connector 185-$i$ adds an optical signal generated by the transceiving device 126-$i$ to the core 20$i$-($i$+1) of the MCF 200-($i$+1). The optical signal generated by the transceiving device 126-$i$ is an optical signal that is transmitted from the Add/Drop node 120-$i$ to the transceiving node 110b.

Moreover, the connector 185-$i$ connects together the core 20$i$-$i$ and the core 20$i$-($i$+1) other than the cores that are the Add/Drop target among the cores of the MCF 200-$i$ and the cores of the MCF 200-($i$+1) to relay optical signals.

The transceiving node 110a and the Add/Drop node 120-1 perform two-way communication using a communication path formed by the core 201-1. The transceiving node 110a and the Add/Drop node 120-2 perform two-way communication using a communication path formed by the cores 202-1 and 202-2. The transceiving node 110a and the Add/Drop node 120-3 perform two-way communication using a communication path formed by the cores 203-1, 203-2, and 203-3.

The transceiving node 110b and the Add/Drop node 120-1 perform two-way communication using a communication path formed by the cores 201-4, 201-3, and 201-2. The transceiving node 110b and the Add/Drop node 120-2 perform two-way communication using a communication path formed by the cores 202-4 and 202-3. The transceiving node 110b and the Add/Drop node 120-3 perform two-way communication using a communication path formed by the core 203-4.

In this manner, the communication system 100D has a tree-type logical topology in which the transceiving nodes 110a and 110b are used as root nodes and can communicate with each of the Add/Drop nodes 120-1 to 120-3. In the communication system 100D, the Add/Drop nodes 120-1 to 120-3 each can communicate with the transceiving nodes 110a and 110b. The Add/Drop nodes 120-1 to 120-3 may use any one of the communication paths between the two transceiving nodes 110a and 110b as an active system (0-system) and use the other as a standby system (1-system). Moreover, the Add/Drop nodes 120-1 to 120-3 may use a communication path of the shorter transmission path as the 0-system and use a communication path of the longer transmission path as the 1-system.

In the communication system 100D, the transceiving node 110a and the transceiving node 110b may be connected together using the MCF 200 or an MCF having four or more cores. In the communication system 100D, when the roles of the transceiving nodes 110a and 110b and the Add/Drop nodes 120-1 to 120-3 are changed, a logical topology can be easily changed by attaching a connector to the transceiving nodes 110a and 110b and replacing the connector 185 of the respective Add/Drop nodes 120-1 to 120-3 with another connector. In this way, it is possible to flexibly cope with a change in the network configuration.

Four communication systems 100, 100A, 100C, and 100D have been described as a communication system to which the connector according to an embodiment of the present invention can be applied. In the respective communication systems, a configuration in which an MCF is used for connection between nodes has been described. However, the fault location specifying method described in the respective embodiments may be applied to a communication system in which SCF (Single Core Fiber) is used for one or more connections between nodes. When the SCF is used for connection between nodes, a conversion connector for connecting together the MCF and a plurality of SCFs or a conversion connector for connecting together a connector and a plurality of SCFs is used.

Figure 9:
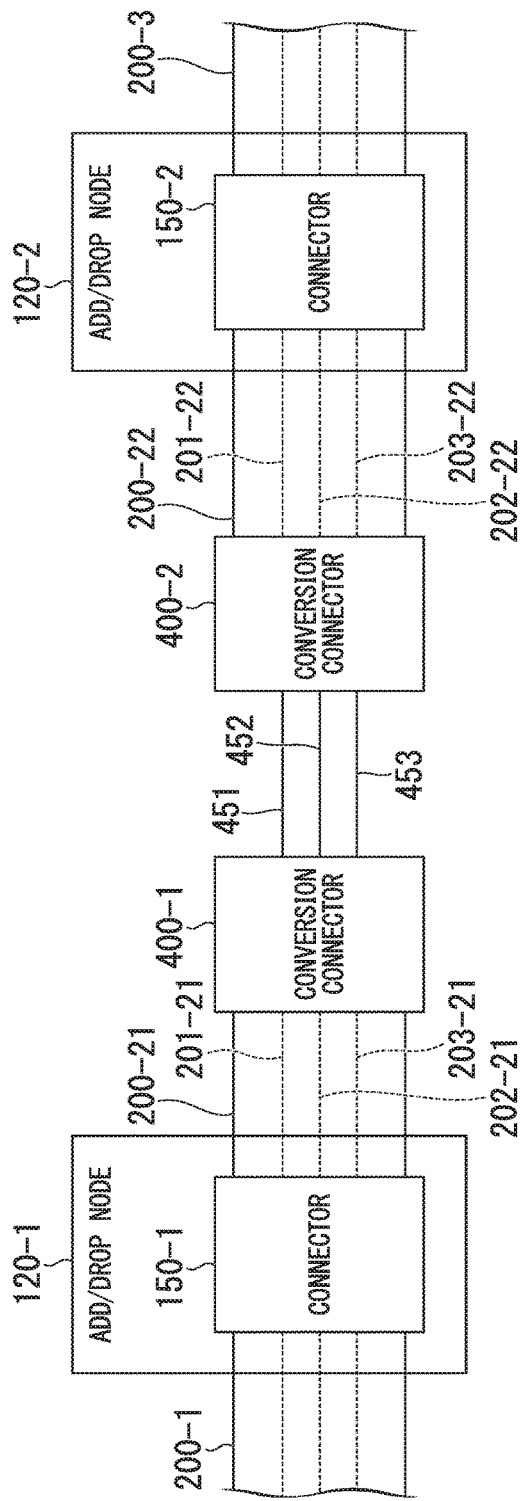
FIG. 9 is a diagram showing a first configuration example of the communication system shown in FIG. 1, in which a plurality of SCFs is used in a partial segment of the connection between Add/Drop nodes.

FIG. 9 is a block diagram showing a first configuration example of the communication system 100 shown in FIG. 1 in which a plurality of SCFs 451, 452, and 453 are used in a partial segment of the connection between the Add/Drop node 120-1 and the Add/Drop node 120-2. The SCFs 451, 452, and 453 are used between an MCF 200-21 connected to a connector 150-1 and an MCF 200-22 connected to a connector 150-2.

A conversion connector 400-1 is used for connection between the MCF 200-21 and the SCFs 451 to 453. The conversion connector 400-1 connects cores 201-21, 202-21, 203-21 of the MCF 200-21 and the SCFs 451, 452, and 453, respectively. A conversion connector 400-2 is used for the connection between the MCF 200-22 and the SCFs 451 to 453. The conversion connector 400-2 connects cores 201-22, 202-22, and 203-22 of the MCF 200-22 and the SCFs 451, 452, and 453, respectively.

The conversion connectors 400-1 and 400-2 have a configuration similar to that of a fan-in device or a fan-out device. By using the conversion connectors 400-1 and 400-2, it is possible to use the SCF in a partial segment of the connection between nodes.

Figure 10:
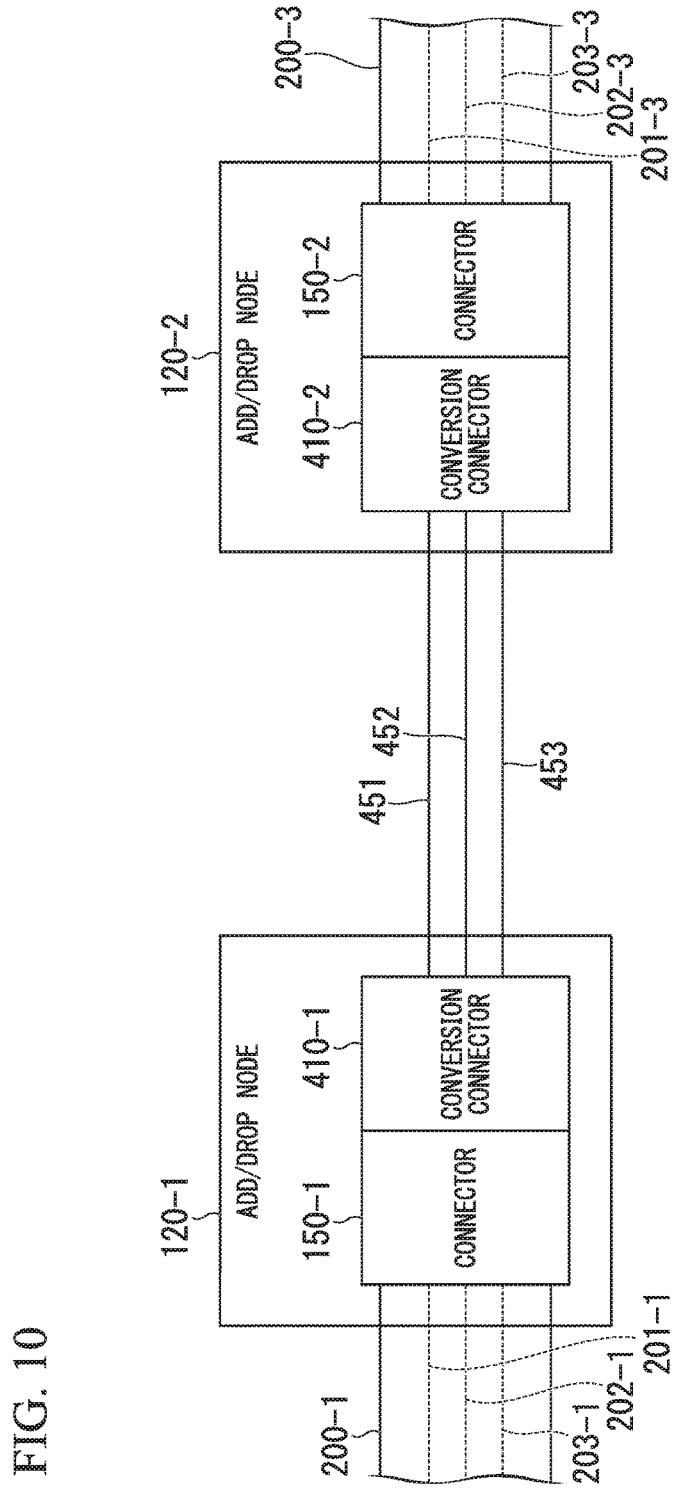
FIG. 10 is a diagram showing a second configuration example of the communication system shown in FIG. 1, in which a plurality of SCFs is used in the connection between Add/Drop nodes.

FIG. 10 is a block diagram showing a second configuration example of the communication system 100 shown in FIG. 1 in which a plurality of SCFs 451, 452, and 453 are used in the connection between the Add/Drop node 120-1 and the Add/Drop node 120-2. The SCFs 451, 452, and 453 are used for the connection between the connector 150-1 and the connector 150-2. The configuration example shown in FIG. 10 is different from the configuration example shown in FIG. 9 in that an MCF is not used for the connection between the Add/Drop nodes 120-1 and 120-2.

The Add/Drop node 120-1 further includes a conversion connector 410-1. The conversion connector 410-1 is attached to a side of the connector 150-1 close to the Add/Drop node 120-2. The Add/Drop node 120-2 further includes a conversion connector 410-2. The conversion connector 410-2 is attached to a side of the connector 150-2 close to the Add/Drop node 120-1. The SCFs 451 to 453 of the same number as the number of cores of the MCF 200 are used for the connection between the conversion connectors 410-1 and 410-2.

The conversion connector 410-1 connects together the SCFs 451, 452, and 453 and the connector 150-1. The connector 150-1 performs input/output of optical signal to/from the conversion connector 410-1 instead of the MCF 200-2. The connector 150-1 connects together the cores 202-1 and 203-1 of the MCF 200-1 and the SCFs 452 and 453, respectively, via the conversion connector 410-1. The conversion connector 410-1 adds an optical signal generated by the transmitting device 121-1 to the SCF 451 via the connector 150-1.

The conversion connector 410-2 connects together the SCFs 451, 452, and 453 and the connector 150-2. The connector 150-2 performs input/output of optical signal to/from the conversion connector 410-2 instead of the MCF 200-2. The connector 150-2 connects together the SCF 451 and 453 and the cores 201-3 and 203-3 of the MCF 200-3, respectively, via the conversion connector 410-2. The connector 150-2 connects an optical signal dropped from the SCF 453 to the receiving device 122-2 via the conversion connector 410-2.

The conversion connectors 410-1 and 410-2 has a configuration similar to that of a fan-in device or a fan-out device. By using the conversion connectors 410-1 and 410-2, it is possible to use the SCF for the connection between nodes.

FIGS. 9 and 10 show a configuration example in which nodes are connected together using the SCF instead of the MCF 200 having three cores. A SCF may be used for the connection between nodes instead of the MCF having two cores or four or more cores. In this case, similarly, a conversion connector is used.

FIGS. 9 and 10 show an example in which a SCF is used for the connection between the Add/Drop nodes 120-1 and 120-2 of the communication system 100 shown in FIG. 1. The SCF may be used for the connection between other nodes. In this case, the conversion connector 400 may be used for the connection between one set of nodes and the conversion connector 410 may be used for the connection between the other set of nodes. Moreover, a combination of the conversion connector 400 that is configured to connect an MCF and a SCF and the conversion connector 410 connected to the connector 150 may be used for the connection between one set of nodes. For example, the conversion connector 400 may be used in the Add/Drop node 120-1, and the conversion connector 410 may be used in the Add/Drop node 120-2.

MCF and SCF may be switched a plurality of times for the connection between one set of nodes. For example, MCF and SCF may be used for the connection between the Add/Drop nodes 120-1 and 120-2 in the order of MCF, SCF, MCF, SCF, and MCF. In this case, a conversion connector is used for each between the MCF and the SCF.

The connector 150-1 and the conversion connector 410-1 described in FIG. 10 may be configured as one connector. Similarly, the connector 150-2 and the conversion connector 410-2 may be configured as one connector. That is, a connector connected to the MCF and the plurality of SCFs may add or drop optical signal to or from the MCF or the SCF and may relay optical signals between the MCF and the SCF.

As described above, the SCF may be used in one or a plurality of connections between the nodes in the communication system 100 shown in FIG. 1 and the other communication systems.

[Embodiments of Present Invention]

In a communication system of an embodiment according to the present invention, in a network that communicably connects together nodes using an MCF, fault information related to problems, faults, or the like for communication in respective nodes is collected is a fault location specifying device. The fault location specifying device specifies an MCF in which a fault has occurred among MCFs that connect together a plurality of nodes on the basis of the collected fault information. A configuration in which an MCF can be applied to the above-described communication system, a fault can be detected and a fault location in the MCF can be specified, will be described. The fault detected in the present embodiment is a fault that is caused by disconnection completely of an MCF, for example.

Figure 11A:
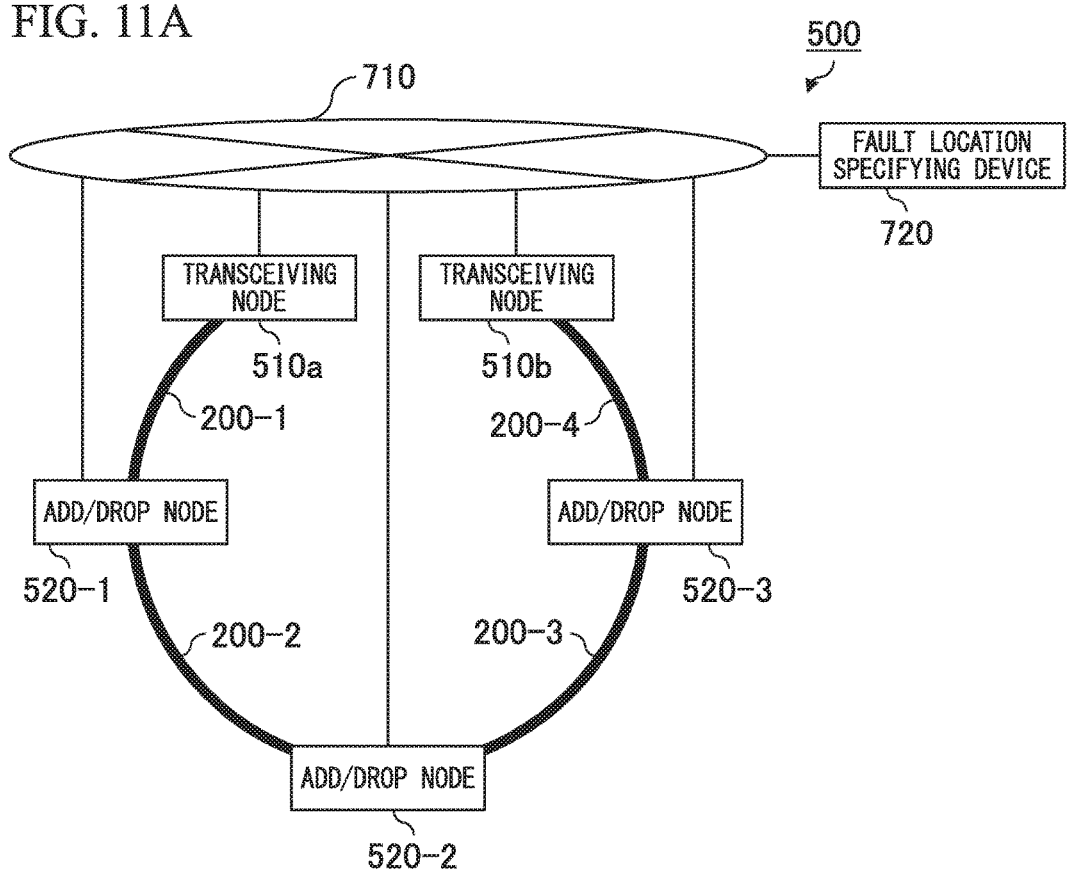
FIG. 11A is a diagram showing physical connection between nodes of a communication system according to an embodiment of the present invention.
Figure 11B:
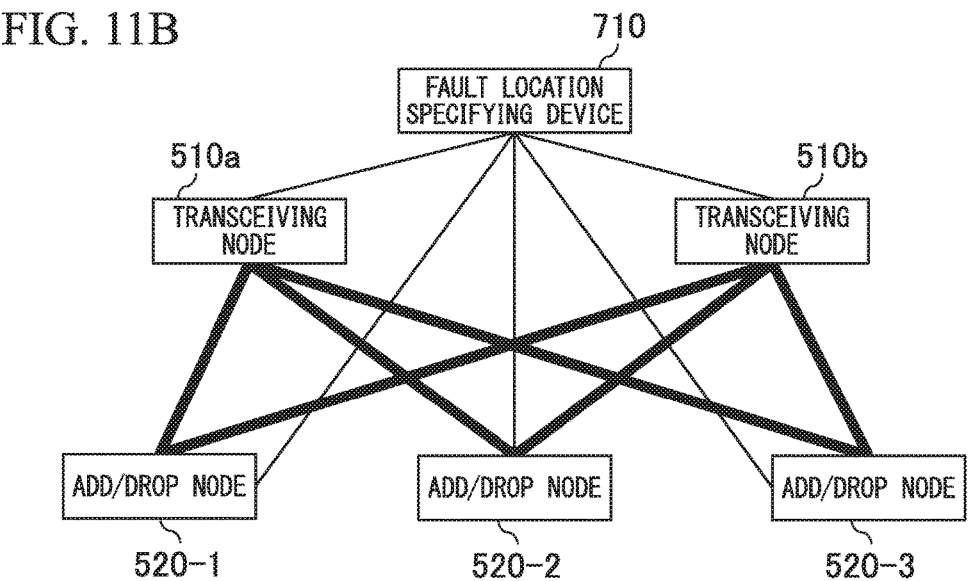
FIG. 11B is a diagram showing logical connection between nodes in a communication system.

FIGS. 11A and 11B are diagrams showing connection of respective nodes of a communication system 500 according to an embodiment of the present invention. FIG. 11A is a diagram showing physical connection of the communication system 500. The communication system 500 includes transceiving nodes 510a and 510b and Add/Drop nodes 520-1 to 520-3. The transceiving nodes 510a and 510b and the Add/Drop nodes 520-1 to 520-3 are connected together by four MCFs 200-1 to 200-4. The communication system 500 has the transceiving nodes 510a and 510b that handle the communication of 0-system (active system) and the communication of 1-system (standby system). The communication system 500 has a physical topology in which the Add/Drop nodes 520-1 to 520-3 are connected together in a ring form. The physical topology of the communication system 500 is the same as the physical topology of the communication system 100D shown in FIG. 8.

The communication system 500 further includes a data communication network (DCN) 710 and a fault location specifying device 720. Respective nodes and the fault location specifying device 720 are connected to the DCN 710. The respective nodes and the fault location specifying device 720 perform communication via the DCN 710. Each node transmits fault information related to a problem, a fault, or the like for communication to the fault location specifying device 720 via the DCN 710. The fault location specifying device 720 specifies an MCF in which a fault has occurred among the MCFs 200-1 to 200-4 on the basis of the fault information received from the respective nodes.

FIG. 11B is a diagram showing a logical topology between respective nodes of the communication system 500 of the present embodiment. The network of the communication system 500 formed by connecting together the MCFs 200-1 to 200-4 and the respective nodes has a tree-type logical topology in which each of the transceiving nodes 510a and 510b is used as root node. The logical topology of the communication system 500 is the same as the logical topology of the communication system 100D shown in FIG. 8.

FIGS. 12A, 12B, 13A, and 13B are diagrams showing a correspondence between a fault location and a combination of presence of a fault indicated by respective pieces of fault information collected from respective nodes. The tables shown in FIGS. 12A, 12B, 13A, and 13B have columns corresponding to communication counterpart nodes and rows corresponding to fault detection source nodes. For each combination of a communication counterpart node and a fault detection source node, either "X" indicating that a fault has been detected or "0" indicating that a fault has not been detected is shown. Since no communication path is formed between the transceiving node 510a and the transceiving node 510b, "-" is shown to indicate that the presence of a fault is not detected for that node combination. Moreover, since no communication path is formed between the respective Add/Drop nodes 520-1 to 520-3, "-" is shown to indicate that the presence of a fault is not detected for that node combination.

The table shown in FIG. 12A shows a combination of presence of faults indicated by the fault information collected to the fault location specifying device 720 when a fault has occurred in the MCF 200-1. When a fault has occurred in the MCF 200-1, since an optical signal is not transmitted via the MCF 200-1, communication cannot be performed between the transceiving node 510a and each of the Add/Drop nodes 520-1 to 520-3. Upon detecting a failure to perform communication, the transceiving node 510a and the Add/Drop nodes 520-1 to 520-3 transmit the disabled communication counterpart and fault information indicating that a fault has occurred between the node and the communication counterpart to the fault location specifying device 720. On the other hand, even when a fault occurs in the MCF 200-1, since the transceiving node 510b and each of the Add/Drop nodes 520-1 to 520-3 can perform communication, no fault is detected in that communication.

The table shown in FIG. 12B shows a combination of presence of faults indicated by the fault information collected in the fault location specifying device 720 when a fault has occurred in the MCF 200-2. When a fault has occurred in the MCF 200-2, since an optical signal is not transmitted via the MCF 200-2, communication cannot be performed between the transceiving node 510a and the Add/Drop nodes 520-2 and 520-3. Furthermore, the transceiving node 510b and the Add/Drop node 520-1 cannot perform communication. Other node combinations can perform communication, and no fault is detected in that communication.

The table shown in FIG. 13A shows a combination of presence of faults indicated by the fault information collected in the fault location specifying device 720 when a fault has occurred in the MCF 200-3. When a fault has occurred in the MCF 200-3, since an optical signal is not transmitted via the MCF 200-3, communication cannot be performed between the transceiving node 510a and the Add/Drop node 520-3. Furthermore, the transceiving node 510b and the Add/Drop nodes 520-1 and 520-2 cannot perform communication. Other node combinations can perform communication, and no fault is detected in that communication.

The table shown in FIG. 13B shows a combination of presence of faults indicated by the fault information collected to the fault location specifying device 720 when a fault has occurred in the MCF 200-4. When a fault has occurred in the MCF 200-4, since an optical signal is not transmitted via the MCF 200-4, communication cannot be performed between the transceiving node 510b and each of the Add/Drop nodes 520-1 to 520-3. The transceiving node 510a and each of the Add/Drop nodes 520-1 to 520-3 can perform communication, and no fault is detected in that communication.

The fault location specifying device 720 specifies which MCF 200 a fault has occurred when a fault occurs in the MCFs 200-1 to 200-4 that connect together nodes by combining fault information notified of by the respective nodes. A combination pattern of the presence of faults is determined on the basis of a physical topology and a logical topology of a network that connects together nodes using the MCF 200. The fault location specifying device 720 can specify the MCF 200 in which a fault has occurred by detecting a pattern identical to the combination of fault information notified of by respective nodes.

Figure 14:
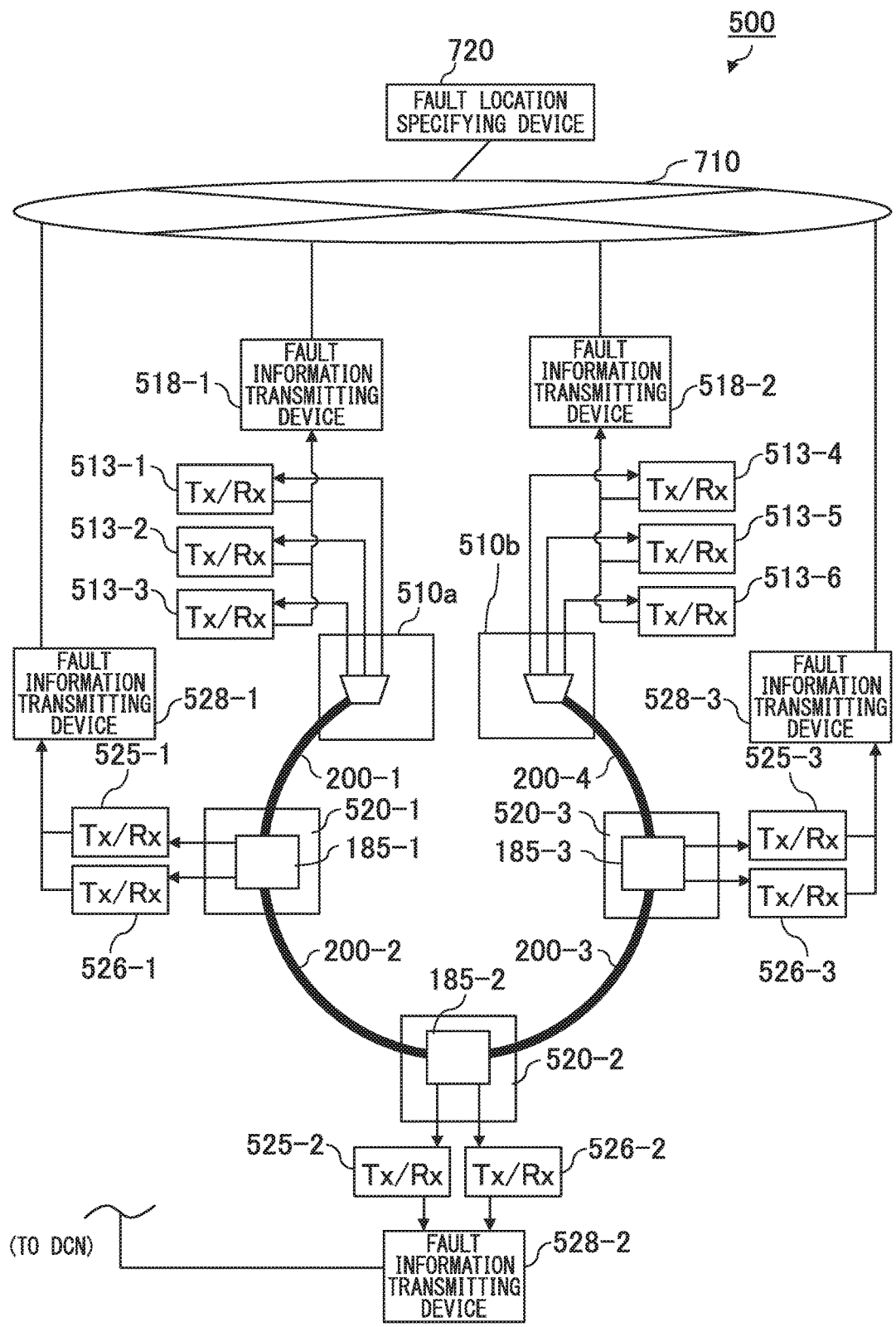
FIG. 14 is a block diagram showing a configuration example of a communication system according to the present embodiment.

FIG. 14 is a block diagram showing a configuration example of the communication system 500 of the present embodiment. As described above, the communication system 500 includes the transceiving nodes 510a and 510b, the Add/Drop nodes 520-1 to 520-3, the MCFs 200-1 to 200-4 that connect together the nodes, the data communication network (DCN) 710, and the fault location specifying device 720. A transceiving device (Tx/Rx) for communicating with other nodes and a fault information transmitting device are included in each node. The fault information transmitting device transmits fault information on a fault in communication with other nodes to the fault location specifying device 720. Moreover, each Add/Drop node 520-i (i=1, 2, 3) includes a connector 185-i. The connector 185-i is connected to the MCF 200-i and the MCF 200-(i+1). Since the connection between each connector 185 and each MCF 200 and allocation of the respective cores 201 to 204 to the MCF 200 in the communication system 500 are the same as those of the communication system 100D shown in FIG. 8, redundant description will be omitted.

Three transceiving devices 513-1 to 513-3 and a fault information transmitting device 518-1 are provided in the transceiving node 510a. Each of the transceiving devices 513-1 to 513-3 generates optical signals including information addressed to the Add/Drop nodes 520-1 to 520-3. Three optical signals generated by the transceiving devices 513-1 to 513-3 are added to the cores 201-1 to 203-1 of the MCF 200-1, respectively. Moreover, each of the transceiving devices 513-1 to 513-3 receives optical signals from the Add/Drop nodes 520-1 to 520-3 via the cores 201-1 to 203-1 of the MCF 200-1. A fan-in device and a fan-out device are used for adding an optical signal to the MCF 200-1 and dropping an optical signal from the MCF 200-1.

Moreover, the transceiving devices 513-1 to 513-3 detect a fault in a communication path on the basis of whether an optical signal can be received from the Add/Drop nodes 520-1 to 520-3 and whether a response to the transmitted optical signal can be received. The transceiving devices 513-1 to 513-3 may perform the determination of occurrence of a fault at predetermined periods. Upon detecting a fault, the transceiving devices 513-1 to 513-3 output information indicating detection of a fault to the fault information transmitting device 518-1. The fault information transmitting device 518-1 generates fault information upon receiving information from the transceiving devices 511-1 to 513-3. The fault information transmitting device 518-1 transmits the generated fault information to the fault location specifying device 720 via the DCN 710. Here, the fault information includes information indicating a subject node as a fault detection source, information indicating a communication counterpart node in a communication path in which a fault was detected, and information indicating detection of a fault in the communication path.

Three transceiving devices 513-4 to 513-6 and a fault information transmitting device 518-2 are provided in the transceiving node 510b. Each of the transceiving devices 513-1 to 513-3 generates optical signals including information addressed to the Add/Drop nodes 520-1 to 520-3. Three optical signals generated by the transceiving devices 513-1 to 513-3 are added to the cores 201-4 to 203-4 of the MCF 200-4, respectively. Moreover, the transceiving devices 513-4 to 513-6 receive optical signals from the Add/Drop nodes 520-1 to 520-3 via the cores 201-4 to 203-4 of the MCF 200-4, respectively. A fan-in device and a fan-out device are used for adding an optical signal to the MCF 200-4 and dropping an optical signal from the MCF 200-4.

Moreover, the transceiving devices 513-4 to 513-6 detect a fault in a communication path on the basis of whether an optical signal can be received from the Add/Drop nodes 520-1 to 520-3 and whether a response to the transmitted optical signal can be received. The transceiving devices 513-4 to 513-6 may perform the determination of occurrence of a fault at predetermined periods. Upon detecting a fault, the transceiving devices 513-4 to 513-6 output information indicating detection of a fault to the fault information transmitting device 518-2. The fault information transmitting device 518-2 generates fault information upon receiving information from the transceiving devices 511-4 to 513-6. The fault information transmitting device 518-2 transmits the generated fault information to the fault location specifying device 720 via the DCN 710.

A connector 185-i, transceiving devices 525-i and 526-i, and a fault information transmitting device 528-i are provided in each Add/Drop node 520-i (i=1, 2, 3). The transceiving device 525-i receives an optical signal that is dropped by the connector 185-i and is transmitted from the transceiving node 510a to the subject node and demodulates and decodes the optical signal. The transceiving device 525-i generates an optical signal including information addressed to the transceiving node 510a and outputs the generated optical signal to the connector 185-i. The transceiving device 526-i receives an optical signal that is dropped by the connector 185-i and is transmitted from the transceiving node 510b to the subject node and demodulates and decodes the optical signal. The transceiving device 526-i generates an optical signal including information addressed to the transceiving node 510b and outputs the generated optical signal to the connector 185-i.

Each of the transceiving devices 525-i and 526-i detects occurrence of a fault in a communication path on the basis of whether an optical signal can be received from the communication counterpart transceiving nodes 510a and 510b, and whether a response to the transmitted optical signal can be received. The transceiving devices 525-i and 526-i may perform the determination on occurrence of a fault at predetermined periods. Upon detecting a fault, the transceiving devices 525-i and 526-i output information indicating detection of a fault to the fault information transmitting device 528-i. Upon receiving information from the transceiving devices 525-i and 526-i, the fault information transmitting device 528-i generates fault information. The fault information transmitting device 528-i transmits the generated fault information to the fault location specifying device 720 via the DCN 710.

FIG. 15 is a diagram showing an example of a fault determination table stored in the fault location specifying device 720 of the present embodiment. The presence of a fault in three communication paths between the transceiving node 510a and each of the Add/Drop nodes 520-1 to 520-3 and the presence of a fault in the communication paths between the transceiving node 510b and the Add/Drop nodes 520-1 to 520-3 are indicated by "0" and "1," and sixteen combinations of the presence of faults in the respective communication paths are shown. The communication paths between the transceiving node 510a and each of the Add/Drop nodes 520-1 to 520-3 are represented by A0, B0, and C0. Moreover, the communication paths between the transceiving node 510b and each of the Add/Drop nodes 520-1 to 520-3 are represented by A1, B1, and C1. Moreover, F1, F2, F3, and F4 in the table of FIG. 15 represent the MCFs 200-1 to 200-4, respectively. The presence of faults in the respective MCFs 200 is represented by "0" and "1." "0" represents that there is no fault, and "1" represents that there is a fault. In the table, a combination of presence of faults in the respective communication paths between nodes is correlated with information indicating the MCF 200 in which a fault has occurred.

For example, in the table, the pattern shown on the second row (No. 2) shows a combination in which a fault has occurred in the communication paths between the transceiving node 510a and each of the Add/Drop nodes 520-1 to 520-3 and a fault has not occurred in the communication paths between the transceiving node 510b and each of the Add/Drop nodes 520-1 to 520-3. This combination is correlated with a combination in which the value of F1 representing the MCF 200-1 is "1" (fault) and the values of F2, F3, and F4 representing the MCFs 200-2 to 200-4 are "0" (no fault). The fault location specifying device 720 specifies a combination of presence of faults in the respective communication paths on the basis of the fault information received from the fault information transmitting devices 518-1 and 518-2 and the fault information transmitting devices 528-1 to 528-3. The fault location specifying device 720 determines the presence of a fault in the respective MCFs 200 by reading a pattern identical to the specified combination from the table. The fault location specifying device 720 can specify the MCF 200 in which a fault has occurred among the respective MCFs 200 that connect together respective nodes by the processing using the table.

As shown in FIG. 15, even when a fault has occurred in two MCFs 200, three MCFs 200, or four MCFs 200 among the MCFs 200-1 to 200-4, the fault location specifying device 720 can specify a section between nodes in which the fault has occured on the basis of the fault information notified of by the respective nodes. As shown in the table of FIG. 15, in the communication system of the present embodiment, the fault information of No. 7 is no different from that of No. 12. Therefore, it is not possible to specify the fault location uniquely, and the fault location is estimated. As for the fault information of the Nos. 10 and 15 and the fault information of Nos. 8, 13, 14, and 16, the fault location is estimated similarly. For example, although it can be reliably determined that a fault has occurred in F1 and F3 in the case of Nos. 7 and 12, since it is not possible to determine a fault in F2, it is estimated that there is a possibility that a fault has occurred in F2.

A fault may be detected using the following logical formula (1) to (4) instead of the table of FIG. 15. In the logical formula (1) to (4), "·" indicates a logical product.

Similarly to the case of FIG. 15, "0" indicates that there is no fault, and "1" indicates that there is a fault.

$$F1 = A0 \cdot B0 \cdot C0 \quad (1)$$

$$F2 = A1 \cdot B0 \cdot C0 \quad (2)$$

$$F3 = A1 \cdot B1 \cdot C0 \quad (3)$$

$$F4 = A1 \cdot B1 \cdot C1 \quad (4)$$

If the value of the result F1, F2, F3, or F4 of the logical formula (1) to (4) is "1," it can be specified that a fault has occurred in the MCFs 200-1 to 200-4. In the communication system of the present embodiment, it is possible to uniquely specify the fault location on the basis of the logical formula (1) to (4) in the case of single fault and the case of a dual fault in which the number fault locations in F1 to F4 detected by the logical formula (1) to (4) is two. When the number of fault locations in F1 to F4 detected by the logical formula (1) to (4) is three or more, it is not possible to specify the fault location uniquely, and it is estimated that there is a possibility that a fault has occurred.

In a network configuration that uses an MCF, respective cores are allocated to communication between nodes, it is possible to check end-to-end connection only. Due to this, when a fault occurs in a communication path that passes through a plurality of MCFs 200, it is difficult to specify a fault location. However, as in the communication system 500 of the present embodiment, when each node notifies the fault location specifying device 720 of fault information, and the fault location specifying device 720 specifies the fault location on the basis of the respective fault information, it is possible to easily detect a fault and specify a fault location.

Although the transceiving node 510a and the transceiving node 510b have been described separately in the present embodiment to indicate a dual system of the 0-system and the 1-system, the transceiving nodes 510a and 510b may be positioned at the same place and may be one node.

The fault information transmitting device in each node may transmit information on a communication path in which a fault has not occurred to be superimposed on the fault information. By obtaining the information on the communication path in which a fault has not occurred, the fault location specifying device 720 can specify or narrow down a fault location without being notified of the fault information by all nodes. For example, when a fault occurs in the MCF 200-2, the transceiving nodes 510a and 510b notify of the fault information, whereby the fault location specifying device 720 can obtain the fault information indicating that the transceiving node 510a can communicate with the Add/Drop node 520-1 and cannot communicate with the Add/Drop nodes 520-2 and 520-3 and the fault information indicating that the transceiving node 510b cannot communicate with the Add/Drop node 520-1 and can communicate with the Add/Drop nodes 520-2 and 520-3. The fault location specifying device 720 can specify the combination of No. 3 in the table of FIG. 15 and specify that the fault location is the MCF 200-2 on the basis of the two pieces of obtained fault information. If the fault location can be specified before the fault information is notified of by all nodes, it is possible to recover from failures or faults quickly.

The fault information may include fault type information and fault time information. The fault type is information indicating a communication failure, an increase in an error rate, or deterioration of an optical signal, for example. By including such information in the fault information, it is possible to detect deterioration of communication quality resulting from degradation of an MCF or troubles in respective MCFs as well as a fault causing a communication failure resulting from disconnection of an MCF.

In the present embodiment, a configuration in which each node is connected to the DCN 710 and the fault information is collected in the fault location specifying device 720 via the DCN 710 has been described. However, some nodes may not be connected to the DCN 710. A node that is not connected to the DCN 710 may transmit the fault information to a node connected to the DCN 710 via an MCF and may notify the fault location specifying device 720 of the fault information via the node. Moreover, the fault location specifying device 720 may be provided in any one of the transceiving nodes 510a and 510b and the Add/Drop nodes 520-1 to 520-3.

Although a configuration of a dual-system network having the 0-system and the 1-system has been described in the present embodiment, the present embodiment can be applied to a single-system network. In this case, it is also possible to detect a fault and specify a fault location. Moreover, although a case in which the physical topology is a ring type and the logical topology is a tree type has been described in the present embodiment, it is possible to detect a fault and specify a fault location in another physical topology and another logical topology of a network in which nodes are communicably connected together using an MCF.

In the present embodiment, a configuration in which the fault information transmitting device is provided in each Add/Drop node to specify a multi-core fiber in which a fault has occurred has been described. However, when it is sufficient to specify a fault location in respective segments between arbitrary Add/Drop nodes formed by a plurality of multi-core fibers, the fault information transmitting device may not be provided in all Add/Drop nodes, but the fault information transmitting device may be provided in the Add/Drop nodes positioned at both ends of each segment.

Moreover, when an SCF is used in some or all segments of the connection between nodes as shown in FIGS. 9 and 10, a fault during transmission of signals through the SCF is also subjected to the detection. In this case, the communication system of the present embodiment can specify or estimate a fault location, and the fault location specifying method of the present embodiment is useful.

One or both of the fault information transmitting device and the fault location specifying device of the above-described embodiments may be realized by a computer. The fault information transmitting device and the fault location specifying device may be realized by recording a program for realizing the fault information transmitting device and the fault location specifying device on a computer-readable recording medium and having a computer system read and execute the program recorded on the recording medium. The "computer system" mentioned herein includes an OS and hardware such as peripheral devices. Moreover, the "computer-readable recording medium" indicates a portable medium such as a flexible disk, a magneto-optical disc, a ROM, or a CD-ROM and a storage device such as a hard disk drive included the computer system. Furthermore, the "computer-readable recording medium" may include one that dynamically stores a program for a short period of time like a communication wire used when the program is transmitted through a network such as the Internet and a communication line such as a telephone line or one that stores a program for a given period of time like a volatile memory inside the computer system that functions as a server and a client in that case. The program may be one for implementing part of the constituent elements, one that can further implement the constituent elements in combination with the program already stored in the computer system, or one realized using hardware such as a programmable logic device (PLD) or a field programmable gate array (FPGA).

While embodiments of the present invention have been described with reference to the drawings, a specific structure is not limited to the embodiments but the present invention embraces design modifications made without departing from the spirit of the present invention.

INDUSTRIAL APPLICABILITY

The present invention is applicable to a use in which it is indispensable to detect a fault and specify a fault location in a network configured using a multi-core fiber.

REFERENCE SIGNS LIST

185 Connector
200 MCF
500 Communication system
510a, 510b Transceiving node
513 Transceiving device
518 Fault information transmitting device
520 Add/Drop node
525, 526 Transceiving device
528 Fault information transmitting device
710 DCN (data communication network)
720 Fault location specifying device

The invention claimed is:

1. A communication system comprising:
three or more nodes;
a plurality of multi-core fibers, at least one of the plurality of multi-core fibers having a plurality of cores and being used in at least a partial segment of a connection from a plurality of connections between the nodes;
a fault information transmitting device, provided in each of the nodes, configured to transmit fault information indicating a communication path in which a fault has occurred and indicating a communication path in which the fault has not occurred; and
a fault location specifying device configured to specify a section between the nodes in which the fault has occurred on the basis of the fault information received from the fault information transmitting device provided in each of the nodes,
wherein the fault location specifying device
includes a table in which a combination of the presence of faults in the respective communication paths formed between the nodes and a combination of the presence of faults in the connections between the nodes are associated, and is configured to detect a combination identical to a combination of the communication path in which the fault has occurred and the communication path in which the fault has not occurred indicated by the fault information received from each of the fault information transmitting devices from the table, and specify the section between the nodes in which the fault has occurred.

2. The communication system according claim 1, wherein the fault location specifying device is configured to specify the section between the nodes in which the fault has occurred using a predetermined logical formula on the basis of the connections between the nodes and the communication paths formed between the nodes.

3. The communication system according to claim 1, wherein
the fault location specifying device is configured to specify the section in which the fault has occurred on the basis of a combination of communication paths in which the fault has not occurred, indicated by the fault information received from each of the fault information transmitting devices.

4. A fault location specifying method in a communication system comprising
three or more nodes, and
a plurality of multi-core fibers, at least one of the plurality of multi-core fibers having a plurality of cores and being used in at least a partial segment of a connection from a plurality of connections between the nodes,
the fault location specifying method comprising:
a first step of transmitting, by a fault information transmitting device provided in each of the nodes, fault information indicating a communication path in which a fault has occurred and indicating a communication path in which the fault has not occurred; and
a second step of specifying, by a fault location specifying device, a section between the nodes in which the fault has occurred on the basis of the fault information received from the fault information transmitting device provided in each of the nodes,
wherein the second step of specifying
detects a combination identical to a combination of the communication path in which the fault has occurred and the communication path in which the fault has not occurred indicated by the fault information received from each of the fault information transmitting devices from a table in which a combination of the presence of faults in the respective communication paths formed between the nodes and a combination of the presence of faults in the connections between the nodes are associated, and specifies the section between the nodes in which the fault has occurred.

* * * * *